United States Patent
Song et al.

(10) Patent No.: US 9,251,591 B2
(45) Date of Patent: Feb. 2, 2016

(54) BODY SHAPE ANALYSIS METHOD AND SYSTEM

(75) Inventors: Hwa K. Song, Ithaca, NY (US); Susan P. Ashdown, Ithaca, NY (US); Anthony P. Reeves, Ithaca, NY (US)

(73) Assignee: Cornell University, Ithaca, NY (US)

( * ) Notice: Subject to any disclaimer, the term of this patent is extended or adjusted under 35 U.S.C. 154(b) by 220 days.

(21) Appl. No.: 13/990,273

(22) PCT Filed: Dec. 1, 2011

(86) PCT No.: PCT/US2011/062904
§ 371 (c)(1),
(2), (4) Date: Aug. 14, 2013

(87) PCT Pub. No.: WO2012/075298
PCT Pub. Date: Jun. 7, 2012

(65) Prior Publication Data
US 2013/0315475 A1    Nov. 28, 2013

Related U.S. Application Data

(60) Provisional application No. 61/418,683, filed on Dec. 1, 2010.

(51) Int. Cl.
*G06K 9/00* (2006.01)
*G06T 7/00* (2006.01)
*G06T 19/00* (2011.01)

(52) U.S. Cl.
CPC .......... *G06T 7/0075* (2013.01); *G06K 9/00369* (2013.01); *G06T 19/00* (2013.01); *G06T 2210/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,330,566 | B2 * | 2/2008 | Cutler | 382/103 |
| 8,655,053 | B1 * | 2/2014 | Hansen | 382/154 |
| 8,831,302 | B2 * | 9/2014 | Mahfouz | 382/128 |
| 8,908,928 | B1 * | 12/2014 | Hansen | 382/111 |
| 2004/0228503 | A1 * | 11/2004 | Cutler | 382/103 |

(Continued)

OTHER PUBLICATIONS

Masuda, Tomoe et al., "Classification of Three-Dimensional Body Shape Based on the Extraction of Body Shape Image Words for Young Women—Impressions of Body Shape Image for Selecting Well-suited Garments," The Society of Fiber Science and Technology, 2007 Japan, vol. 63, No. 2 9pp. 23-32).*

(Continued)

*Primary Examiner* — Anand Bhatnagar
(74) *Attorney, Agent, or Firm* — Harris Beach PLLC

(57) ABSTRACT

A method for categorizing body shape is provided comprising the steps of providing a data set of body shape-defining measurements of a portion of the body of interest from a plurality of subjects' bodies, wherein the measurements define a silhouette and profile (front and side) perspectives of the portion of the body of interest; conducting a principal component (PC) analysis of the data set of measurements to calculate and generate PC scores; conducting cluster analysis using the PC scores as independent variables to produce cluster analysis results; and establishing one or more body shape categories from the cluster analysis results, thereby categorizing body shapes of the plurality of subjects. A shape prototyping system is also provided for designing a custom fit garment for an individual subject, the system being based on the method for categorizing body shape.

20 Claims, 24 Drawing Sheets

(56) References Cited

U.S. PATENT DOCUMENTS

Figure 1:
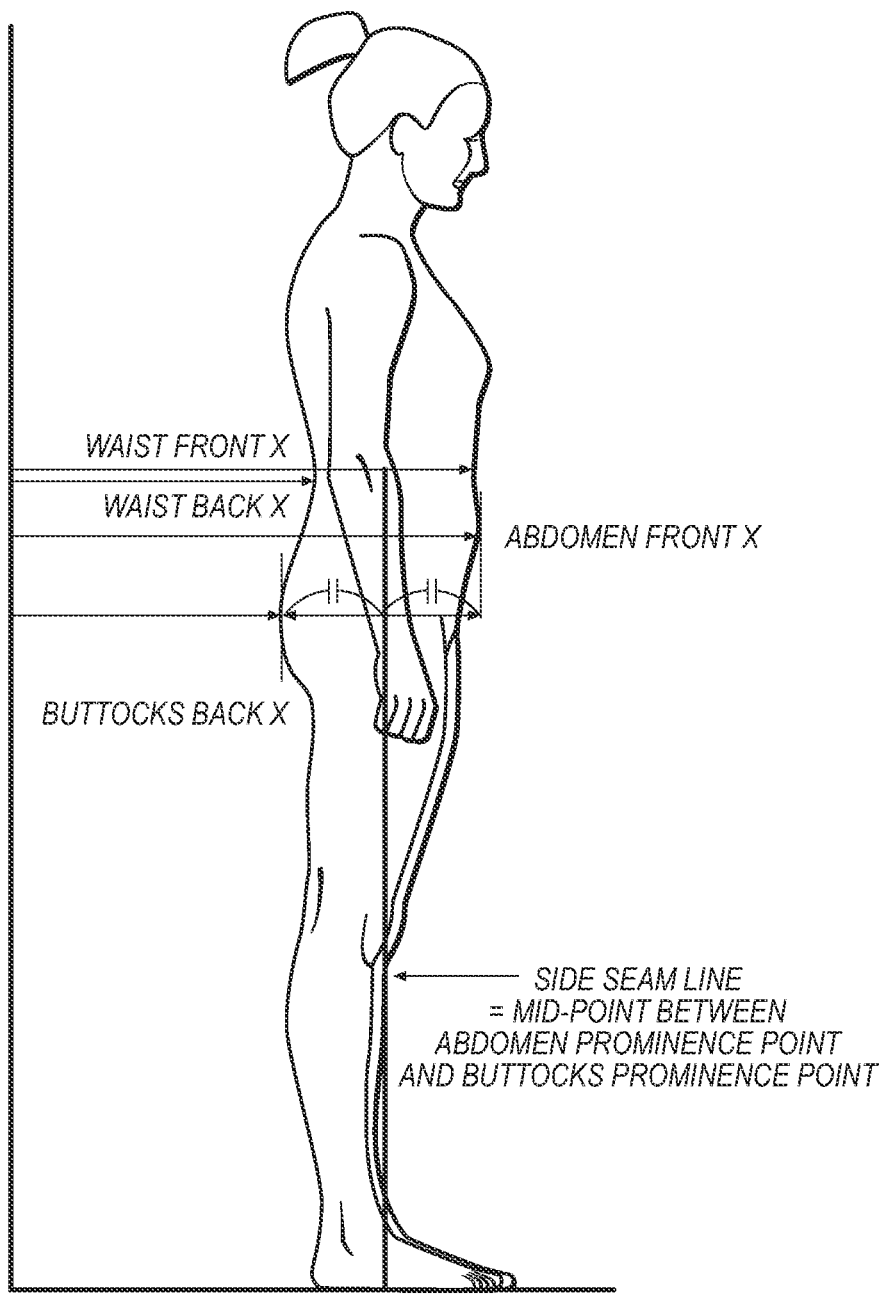

| | | | |
|---|---|---|---|
| 2007/0237364 A1* | 10/2007 | Song et al. | 382/115 |
| 2008/0255920 A1 | 10/2008 | Vandergriff et al. | |
| 2008/0285807 A1 | 11/2008 | Lee et al. | |
| 2009/0116698 A1* | 5/2009 | Zhang et al. | 382/111 |
| 2011/0292034 A1* | 12/2011 | Corazza et al. | 345/419 |
| 2013/0076913 A1* | 3/2013 | Xu et al. | 348/169 |

OTHER PUBLICATIONS

Simmons, Karla et al., Female Figure Identification Technique (FFIT) for Apparel Part II: Development of Shape Sorting Software, Summer 2004, Journal of Textile and Apparel Technology and Management, vol. 4, Issue 1 (pp. 1-15).

Green Mary E., "An Application of U.S. Army Women's Anthropometric Data to the Derivation of Hypothetical Sizing/Tariffing Systems," 1981, Clothing Research Journal, vol. 9, No. 1 (pp. 16-32).

Korean Intellectual Property Office, International Search Report and Written Opinion of the International Searching Authority for PCT/US2011/062904 mailed Jul. 30, 2012 (10 pages).

Masuda, Tomoe et al., "Classification of Three-Dimensional Body Shape Based on the Extraction of Body Shape Image Words for Young Women—Impressions of Body Shape Image for Selecting Well-suited Garments," The Society of Fiber Science and Technology, 2007 Japan, vol. 63, No. 2 (pp. 23-32).

Apeagyei, P.R. et al., "Usability of pattern customising technology in the achievement and testing of fit for mass customisation," 2007 Journal of Fashion Marketing and Management, vol. 11, No. 3 (pp. 349-365).

Connell, L.J. et al., Body Shape Assessment Scale: Instrument Development for Analyzing Female Figures, 2006 Clothing Textiles Res. J., vol. 24, No. 2 (pp. 80-95).

Istook, C.L., "Enabling mass customization: Computer-driven alteration methods," 2002 International Journal of Clothing Science and Technology, vol. 14, No. 1 (pp. 61-76).

Salusso-Deonier, C.J. et al., A Multivariate Method of Classifying Body Form Variation for Sizing Women's Apparel, 1985 Clothing Textiles Res. J., vol. 4, No. 1 (pp. 38-45).

Lee, Hyun-Young et al., "Classification of Middle Aged Women's Breast Shapes Using 3D Body Measurement Data," 2010 Journal of the Korean Society of Clothing and Textiles, vol. 34, No. 3 (pp. 385-392) and English translation (23 pages).

* cited by examiner

Table 1

| | Measurement Procedures |
|---|---|
| Girth | A horizontal circumference around the body, taken parallel to the floor. |
| Front (back) arc | The front (back) portion of the girth from left to right side seam locations.<br>- Side seam for waist front (back) arcs: a vertical line extending from the center of the armscye to the floor.<br>- Side seam for top hip front (back) arcs: a vertical line from the center of side body at the top hip level.<br>- Side seam for top hip front (back) arcs: a vertical line from the center of side body at the hip level. |
| Width | A horizontal distance taken parallel to the floor on the frontal plane. |
| Depth | A horizontal distance taken parallel to the floor on the sagittal plane. |
| Front (back) depth | A front (back) portion of the depth bisected by a frontal plane located at the side seam.<br>- Side seam for front (back) depths: a vertical line located at the mid-point between the abdomen prominence point and buttocks prominence point (see Figure 1) |
| | Landmark locations |
| Waist | The smallest point of back waist as seen from the side. |
| Top hip | A point half the distance between waist and hip level. |
| Abdomen | The greatest prominent point of the abdomen as seen from the side. |
| Hip | The greatest prominent point of the buttocks as seen from the side. |
| Max-thigh | One inch below the crotch. |

FIG. 7

Table 2

| Variable | Mean | Range | S.D. | Skewness | Kurtosis |
|---|---|---|---|---|---|
| Girth: Hip – Waist | 23.1 (9.1) | 31.3 (12.3) | 1.99 | -.04 | -.14 |
| Girth: Top hip – Waist | 14.9 (5.8) | 21.8 (8.6) | 1.42 | .09 | -.05 |
| Girth: Hip – Top hip | 8.2 (3.2) | 18.9 (7.4) | 1.41 | -.03 | -.50 |
| Front arc: Hip – Waist | 8.2 (3.2) | 16.1 (6.3) | 1.04 | -.10 | -.14 |
| Front arc: Top hip – Waist | 4.9 (1.9) | 12.8 (5.0) | .83 | .01 | -.15 |
| Front arc: Hip – Top hip | 3.2 (1.3) | 10.4 (4.1) | .68 | -.16 | -.17 |
| Back arc: Hip – Waist | 12.9 (5.1) | 16.6 (6.5) | 1.12 | .10 | -.14 |
| Back arc: Top hip – Waist | 10.0 (3.9) | 14.9 (5.9) | .98 | .26 | -.10 |
| Back arc: Hip – Top hip | 2.9 (1.1) | 9.5 (3.7) | .64 | .03 | -.12 |
| Width: Hip – Waist | 8.2 (3.2) | 11.3 (4.5) | .75 | .16 | -.17 |
| Front Depth: Abdomen – Waist | 0.7 (.3) | 7.5 (3.0) | .34 | -.02 | 2.04 |
| Front Depth: Abdomen – Hip | 2.6 (1.0) | 10.8 (4.2) | .46 | .11 | .81 |
| Front Depth: Hip – Waist | 6.8 (2.7) | 9.6 (3.8) | .65 | .12 | -.13 |
| Depth: Hip – Waist | 4.9 (1.9) | 9.4 (3.7) | .62 | -.11 | -.10 |
| Buttocks angle | 22.66 | 23.23 | 3.99 | -.01 | -.17 |

Table 3

| | Percentile | | | | | | |
|---|---|---|---|---|---|---|---|
| | 5th | 10th | 25th | 50th | 75th | 90th | 95th |
| BMI | 18.6 | 19.6 | 21.2 | 23.9 | 28.1 | 34.1 | 38.3 |
| Waist girth | 67.9 (26.7) | 70.1 (27.6) | 74.5 (29.3) | 80.6 (31.7) | 89.9 (35.4) | 101.7 (40.0) | 110.2 (43.4) |
| Hip girth | 91.8 (36.1) | 93.9 (37.0) | 98.5 (38.8) | 104.0 (40.9) | 112.3 (44.2) | 123.4 (48.6) | 130.6 (51.4) |

FIG. 8

Table 4

| Component | Rotation sums of squared loading | | |
|---|---|---|---|
| | Eigenvalue | % of Variance | Cumulative % |
| 1 | 4.2 | 28.0 | 28.0 |
| 2 | 3.3 | 21.9 | 50.0 |
| 3 | 3.0 | 19.9 | 69.8 |
| 4 | 1.4 | 9.3 | 79.2 |
| 5 | 1.3 | 8.5 | 87.7 |

Table 5

| Variable | Principal component | | | | | |
|---|---|---|---|---|---|---|
| | 1 | 2 | 3 | 4 | 5 | 6 |
| Girth: Top Hip – Waist | .934 | -.139 | .283 | .118 | -.024 | .000 |
| Width: Hip – Waist | .827 | .297 | .119 | -.043 | .145 | -.101 |
| Front arc: Top Hip – Waist | .773 | -.072 | -.154 | .453 | -.155 | -.133 |
| Girth: Hip – Waist | .718 | .586 | .305 | .110 | -.051 | .156 |
| Front arc: Hip – Waist | .716 | .505 | -.102 | .256 | -.194 | -.036 |
| Back arc: Top Hip – Waist | .704 | -.142 | .545 | -.215 | .097 | .086 |
| Back arc: Hip – Waist | .603 | .346 | .586 | -.072 | .114 | -.051 |
| Girth: Hip – Top Hip | .072 | .966 | .145 | .036 | -.048 | .016 |
| Front arc: Hip – Top Hip | .147 | .860 | .032 | -.165 | -.106 | -.081 |
| Back arc: Hip – Top Hip | -.022 | .820 | .191 | .202 | .052 | .122 |
| Buttocks angle | -.018 | .125 | .893 | -.083 | .113 | .262 |
| Back Depth: Hip – Waist | .207 | .131 | .844 | -.066 | .235 | -.400 |
| Depth: Hip – Waist | .275 | .229 | .712 | .376 | -.412 | .085 |
| Front Depth: Abdomen – Waist | .122 | .057 | -.052 | .907 | .085 | -.013 |
| Front Depth: Abdomen – Hip | .016 | -.079 | .202 | .083 | .954 | .069 |

FIG. 9

Table 6

| Variable | Component 1 | 2 | 3 | 4 | 5 |
|---|---|---|---|---|---|
| Girth: Top Hip – Waist | .890 | -.142 | .296 | .015 | .066 |
| Front arc: Top Hip – Waist | .882 | -.097 | -.075 | -.117 | .288 |
| Width: Hip – Waist | .806 | .298 | .146 | .183 | -.108 |
| Front arc: Hip – Waist | .798 | .495 | -.030 | -.152 | .118 |
| Girth: Hip – Top Hip | .064 | .962 | .146 | -.047 | .047 |
| Front arc: Hip – Top Hip | .140 | .876 | .045 | -.089 | -.173 |
| Back arc: Hip – Top Hip | -.014 | .805 | .178 | .035 | .220 |
| Buttocks angle | -.063 | .121 | .898 | .142 | -.087 |
| Back Depth: Hip – Waist | .204 | .125 | .881 | .283 | -.145 |
| Depth: Hip – Waist | .317 | .225 | .746 | -.381 | .322 |
| Front Depth: Abdomen – Hip | -.006 | -.078 | .190 | .966 | .074 |
| Front Depth: Abdomen – Waist | .174 | .064 | -.076 | .064 | .950 |

Table 7

| Variable | Component 1 | 2 | 3 |
|---|---|---|---|
| Front arc: Top Hip – Waist | .931 | -.083 | -.086 |
| Girth: Top Hip – Waist | .880 | -.148 | .318 |
| Front arc: Hip – Waist | .815 | .507 | -.030 |
| Width: Hip – Waist | .755 | .273 | .209 |
| Girth: Hip – Top Hip | .068 | .962 | .154 |
| Front arc: Hip – Top Hip | .105 | .878 | .059 |
| Back arc: Hip – Top Hip | .021 | .801 | .181 |
| Buttocks angle | -.099 | .103 | .914 |
| Back Depth: Hip – Waist | .151 | .098 | .913 |
| Depth: Hip – Waist | .379 | .253 | .694 |

FIG. 10

Table 8

| Variables for cluster analysis | Body shape group | | | | | | F | Sig. |
| --- | --- | --- | --- | --- | --- | --- | --- | --- |
| | 1 (n=727) Curvy shape | | 2 (n=867) Hip tilt shape | | 3 (n=894) Straight shape | | | |
| | Mean | S.D. | Mean | S.D. | Mean | S.D. | | |
| PC1: Waist to top hip silhouette | .967 a | .731 | -.356 b | .814 | -.440 c | .793 | 784.636 | .000 * |
| PC2: Top hip to hip silhouette | .008 b | .970 | -.367 c | .965 | .349 a | .929 | 124.186 | .000 * |
| PC3: Buttocks prominence | -.151 b | .832 | .730 a | .836 | -.585 c | .816 | 572.582 | .000 * |
| Z1: Abdomen prominence | .894 a | .816 | -.403 c | .746 | -.337 b | .884 | 614.963 | .000 * |
| Z2: Slope from abdomen to hip | -.023 b | .775 | .720 a | .847 | -.679 c | .797 | 659.569 | .000 * |

FIG. 11

Table 9

|  | Variables | Body shape group | | | | | | F | Sig. |
|---|---|---|---|---|---|---|---|---|---|
|  |  | 1 (n=727) Curvy shape | | 2 (n=867) Hip tilt shape | | 3 (n=894) Straight shape | | | |
|  |  | Mean | S.D. | Mean | S.D. | Mean | S.D. | | |
| PC1 | Front arc: Top Hip – Waist | 6.93 (2.73) a | .60 | 4.09 (1.61) b | .70 | 4.09 (1.61) b | .65 | 755.85 | .000* |
|  | Girth: Top Hip – Waist | 17.81 (7.01) a | 1.12 | 14.88 (5.86) b | 1.23 | 12.65 (4.98) c | 1.14 | 606.47 | .000* |
|  | Front arc: Hip – Waist | 10.24 (4.03) a | .81 | 6.83 (2.69) c | .92 | 7.75 (3.05) b | .90 | 477.52 | .000* |
|  | Width: Hip – Waist | 9.32 (3.67) a | .66 | 7.98 (3.14) b | .70 | 7.39 (2.91) c | .69 | 252.10 | .000* |
| PC2 | Girth: Hip – Top Hip | 8.43 (3.32) b | 1.38 | 7.21 (2.84) c | 1.40 | 8.97 (3.53) a | 1.37 | 56.63 | .000* |
|  | Front arc: Hip – Top Hip | 3.28 (1.29) b | .68 | 2.74 (1.08) c | .69 | 3.66 (1.44) a | .62 | 66.57 | .000* |
|  | Back arc: Hip – Top Hip | 3.00 (1.18) a | .61 | 2.62 (1.03) b | .65 | 3.10 (1.22) a | .64 | 20.81 | .000* |

FIG. 12A

Table 9 (continued)

| | Variables | Body shape group | | | | | | F | Sig. |
|---|---|---|---|---|---|---|---|---|---|
| | | 1 (n=727) Curvy shape | | 2 (n=867) Hip tilt shape | | 3 (n=894) Straight shape | | | |
| | | Mean | S.D. | Mean | S.D. | Mean | S.D. | | |
| | Buttocks angle | 21.69 b | 3.46 | 25.35 a | 3.38 | 20.84 c | 3.51 | 415.09 | .000* |
| PC3 | Back Depth: Hip – Waist | 6.65 (2.62) b | .52 | 8.00 (3.15) a | .55 | 5.74 (2.26) c | .52 | 629.38 | .000* |
| | Depth: Hip – Waist | 5.56 (2.19) a | .54 | 4.93 (1.94) b | .62 | 4.34 (1.71) c | .58 | 137.74 | .000* |
| Z1 | Front Depth: Abdomen – Hip | 1.54 (.57) a | .28 | 0.30 (.12) c | .26 | 0.36 (.14) b | .30 | 614.96 | .000* |
| Z2 | Front Depth: Abdomen – Waist | 2.54 (1.00) b | .35 | 3.40 (1.34) a | .39 | 1.78 (.70) c | .36 | 659.57 | .000* |

FIG. 12B

Table 10

| Age group | | | Body shape group | | | Total |
|---|---|---|---|---|---|---|
| | | | 1 Curvy shape | 2 Hip tilt shape | 3 Straight shape | |
| | 18 to 25 | Count | 276 | 488 | 595 | 1,359 |
| | | % | 20.3% | 35.9% | 43.8% | 100.0% |
| | 26 to 35 | Count | 451 | 379 | 299 | 1,129 |
| | | % | 39.9% | 33.6% | 26.5% | 100.0% |
| | Total | Count | 727 | 869 | 894 | 2,488 |
| | | % | 29.2% | 34.8% | 35.9% | 100.0% |

Table 11

| Ethnic group | | | Body shape group | | | Total |
|---|---|---|---|---|---|---|
| | | | 1 Curvy shape | 2 Hip tilt shape | 3 Straight shape | |
| | Caucasian | Count | 438 | 318 | 413 | 1,169 |
| | | % | 37.5% | 27.2% | 35.3% | 100.0% |
| | Hispanic | Count | 74 | 181 | 172 | 427 |
| | | % | 17.3% | 42.4% | 40.3% | 100.0% |
| | African American | Count | 81 | 209 | 126 | 416 |
| | | % | 19.5% | 50.2% | 30.3% | 100.0% |
| | Others | Count | 134 | 159 | 183 | 476 |
| | | % | 28.2% | 33.4% | 38.4% | 100.0% |
| | Total | Total | 727 | 867 | 894 | 2,488 |
| | | % | 29.2% | 34.8% | 35.9% | 100.0% |

FIG. 13

Table 12

| Test of Function(s) | Wilks' Lambda | Chi-square | df | Sig. |
|---|---|---|---|---|
| 1 through 2 | .192 | 4094.964 | 18 | .000 |
| 2 | .464 | 1904.455 | 8 | .000 |

Table 13

| Function | Eigenvalue | % of Variance | Cumulative % | Canonical Correlation |
|---|---|---|---|---|
| 1 | 1.418 | 55.1 | 55.1 | .766 |
| 2 | 1.155 | 44.9 | 100.0 | .732 |

Table 14

| | Variable | Function 1 | Function 2 |
|---|---|---|---|
| a | Front arc: Top Hip – Waist | -.143 | .357 |
| b | Girth: Top Hip – Waist | -.011 | .327 |
| c | Front arc: Hip – Waist | -.386 | .023 |
| d | Width: Hip – Waist | -.197 | .191 |
| e | Girth: Hip – Top Hip | -.165 | -.258 |
| f | Buttocks angle | .089 | .017 |
| g | Depth: Hip – Waist | .858 | .544 |
| h | Front Depth: Abdomen – Waist | -2.324 | 1.522 |
| i | Front Depth: Abdomen – Hip | 2.158 | 1.420 |
| | Constant | -2.493 | -5.740 |

FIG. 14

Table 15

| | | | Predicted group membership | | | Total |
|---|---|---|---|---|---|---|
| | | | 1 | 2 | 3 | |
| Original group membership | Count | 1 | 703 | 10 | 14 | 727 |
| | | 2 | 4 | 853 | 10 | 867 |
| | | 3 | 11 | 13 | 870 | 894 |
| | % | 1 | 96.7 | 1.4 | 1.9 | 100.0 |
| | | 2 | .5 | 98.4 | 1.2 | 100.0 |
| | | 3 | 1.2 | 1.5 | 97.3 | 100.0 |

FIG. 15

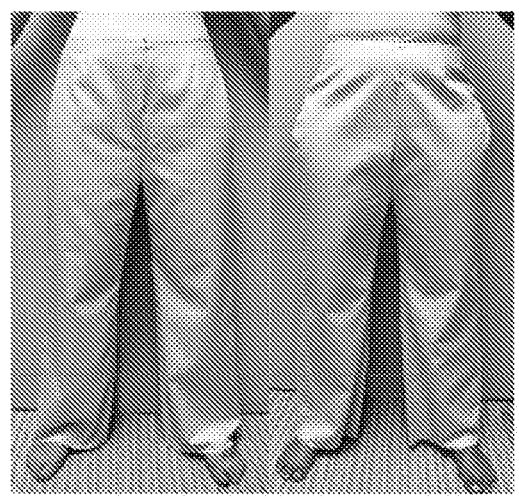
A　　Front view　　B
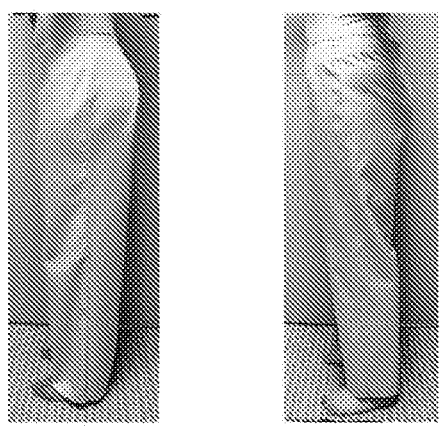
A　　Side view　　B
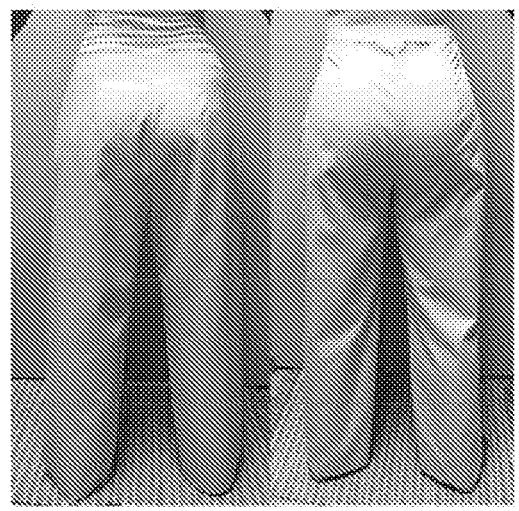
A　　Back view　　B
FIG. 18

Table 16

| F-value | | | | | | Mean | | | | | | | | |
|---|---|---|---|---|---|---|---|---|---|---|---|---|---|---|
| Type | Group | Judge | Type × Group | Type × Judge | Group × Judge | Type | | Group | | | Judge | | | |
| | | | | | | A | B | 1 | 2 | 3 | 1 | 2 | 3 |
| 24.085 * (p = .000) | .852 | 3.260 (p = .041) | .213 | 2.431 | .471 | 3.61 | 3.03 | 3.44 | 3.15 | 3.35 | 3.37 | 3.46 | 3.11 |

Table 17

| Area | Test of Model Effect (p-value) | | | | | | Estimated Marginal Mean | | | | | | | |
|---|---|---|---|---|---|---|---|---|---|---|---|---|---|---|
| | Type | Group | Judge | Type × Group | Type × Judge | Group × Judge | Type | | Group | | | Judge | | |
| | | | | | | | A | B | 1 | 2 | 3 | 1 | 2 | 3 |
| Front waist ease | .003 | .346 | .166 | .512 | .119 | .118 | .90 | .59 | .74 | .85 | .90 | .84 | .76 | .72 |
| Back waist ease | .001 | .435 | .017 | .750 | .992 | .625 | .83 | .37 | .59 | .56 | .73 | .75 | .50 | .62 |
| Front waist placement | .036 | .066 | .001 | .287 | .032 | .795 | .79 | .60 | .83 | .52 | .71 | .58 | .46 | .89 |
| Back waist placement | .009 | .403 | .008 | .070 | .622 | - | .88 | .69 | .85 | .83 | .70 | .92 | .66 | .74 |
| Abdomen ease | .705 | .575 | .008 | .666 | .235 | .278 | .40 | .37 | .46 | .37 | .33 | .44 | .28 | .44 |
| Buttocks ease | .558 | .530 | .221 | .922 | .346 | .762 | .52 | .46 | .44 | .46 | .56 | .50 | .43 | .54 |
| Front crotch ease | .171 | .556 | .001 | .462 | .038 | .753 | .54 | .38 | .43 | .53 | .42 | .67 | .21 | .54 |
| Back crotch ease | .415 | .091 | .002 | .543 | .030 | .979 | .23 | .31 | .42 | .20 | .21 | .48 | .08 | .38 |
| Front thigh ease | .848 | .070 | .140 | .505 | .006 | .354 | .63 | .61 | .65 | .49 | .72 | .74 | .58 | .54 |
| Back thigh ease | .131 | .418 | .028 | .914 | .012 | .363 | .19 | .34 | .21 | .18 | .39 | .18 | .39 | .21 |
| Crotch length | .048 | .446 | .003 | .199 | .390 | .644 | .37 | .19 | .33 | .21 | .27 | .29 | .14 | .44 |
| Inseam length | .414 | .636 | .034 | .961 | .621 | .316 | .52 | .58 | .48 | .58 | .58 | .56 | .37 | .71 |
| Side seam placement | .000 | .948 | .016 | .399 | .147 | .733 | .85 | .16 | .50 | .53 | .49 | .43 | .33 | .75 |

FIG. 19

Table 18

| | Group | Type A | Type B | A-B | t | df | Sig. |
|---|---|---|---|---|---|---|---|
| Front waist ease | 1 | .93 | .48 | 0.44 | 4.000 | 26 | .000 |
| | 2 | .89 | .52 | 0.37 | 3.407 | 26 | .002 |
| | 3 | .85 | .74 | 0.11 | 1.000 | 26 | .327 |
| Back waist ease | 1 | .74 | .37 | 0.37 | 3.058 | 26 | .005 |
| | 2 | .81 | .30 | 0.52 | 4.647 | 26 | .000 |
| | 3 | .89 | .48 | 0.41 | 3.328 | 26 | .003 |
| Front waist placement | 1 | .78 | .74 | 0.04 | .440 | 26 | .663 |
| | 2 | .52 | .48 | 0.04 | .328 | 26 | .746 |
| | 3 | .78 | .52 | 0.26 | 2.054 | 26 | .050 |
| Back waist placement | 1 | .81 | .81 | 0.00 | .000 | 26 | 1.000 |
| | 2 | .96 | .63 | 0.33 | 3.122 | 26 | .004 |
| | 3 | .78 | .56 | 0.22 | 2.280 | 26 | .031 |
| Abdomen ease (Front view) | 1 | .48 | .44 | 0.04 | .273 | 26 | .787 |
| | 2 | .44 | .30 | 0.15 | 1.072 | 26 | .294 |
| | 3 | .30 | .37 | -0.07 | -.527 | 26 | .602 |
| Buttocks ease (back view) | 1 | .44 | .44 | 0.00 | .000 | 26 | 1.000 |
| | 2 | .52 | .41 | 0.11 | .769 | 26 | .449 |
| | 3 | .59 | .52 | 0.07 | .493 | 26 | .626 |
| Front crotch ease | 1 | .44 | .48 | -0.04 | -.296 | 26 | .769 |
| | 2 | .67 | .41 | 0.26 | 1.763 | 26 | .090 |
| | 3 | .52 | .37 | 0.15 | 1.162 | 26 | .256 |
| Back crotch ease | 1 | .48 | .44 | 0.04 | .328 | 26 | .746 |
| | 2 | .19 | .33 | -0.15 | -1.162 | 26 | .256 |
| | 3 | .30 | .22 | 0.07 | .570 | 26 | .574 |
| Front thigh ease | 1 | .63 | .63 | 0.00 | .000 | 26 | 1.000 |
| | 2 | .56 | .41 | 0.15 | 1.072 | 26 | .294 |
| | 3 | .63 | .78 | -0.15 | -1.162 | 26 | .256 |
| Back thigh ease | 1 | .22 | .30 | -0.07 | -.570 | 26 | .574 |
| | 2 | .11 | .26 | -0.15 | -1.688 | 26 | .103 |
| | 3 | .33 | .48 | -0.15 | -1.442 | 26 | .161 |
| Crotch length | 1 | .56 | .15 | 0.41 | 3.051 | 26 | .005 |
| | 2 | .30 | .19 | 0.11 | 1.140 | 26 | .265 |
| | 3 | .30 | .30 | 0.00 | .000 | 26 | 1.000 |
| Inseam length | 1 | .44 | .52 | -0.07 | -.700 | 26 | .490 |
| | 2 | .56 | .59 | -0.04 | -.570 | 26 | .574 |
| | 3 | .56 | .59 | -0.04 | -.570 | 26 | .574 |
| Side seam placement | 1 | .78 | .22 | 0.56 | 4.507 | 26 | .000 |
| | 2 | .81 | .22 | 0.59 | 4.841 | 26 | .000 |
| | 3 | .89 | .11 | 0.78 | 9.539 | 26 | .000 |

FIG. 20

BODY SHAPE ANALYSIS METHOD AND SYSTEM

CROSS-REFERENCE TO RELATED APPLICATIONS

This application is a national stage application under 35 U.S.C. §371 of PCT Application No. PCT/US2011/062904, filed Dec. 1, 2011, which claims priority to and the benefit of U.S. provisional patent application Ser. No. 61/418,683, entitled Body Shape Analysis Method, filed Dec. 1, 2010, which is incorporated herein by reference in its entirety.

STATEMENT REGARDING FEDERALLY SPONSORED RESEARCH OR DEVELOPMENT

The disclosed invention was made with government support under contract no. ITA-08-07400 from the National Textile Center. The government has rights in this invention.

1. TECHNICAL FIELD

The present invention relates to methods for three-dimensional body scanning to improve the fit of clothing. The invention also relates to methods for categorizing body shapes to improve the fit of clothing.

2. BACKGROUND OF THE INVENTION

Three-dimensional (3D) body scanning technology has shown the potential of providing data that can be used to improve the fit of clothing. 3D body scanners can automatically generate a set of over 100 measurements in a short time (5 to 15 seconds for the scan, 1 to 2 minutes to generate measurements), and therefore they have been used for several large-scale anthropometric surveys in the U.K., the U.S., Germany, Japan, Korea, and Thailand. Up-to-date anthropometric data assists ready-to-wear apparel companies to identify sectors of the market, and update their sizing systems to provide good fit for their target market customers. Mass customization and automated custom clothing have recently been regarded as an additional way for the apparel industry to address consumer complaints about garment fit; 3D body scanners are useful tools in implementing these processes. Apparel companies such as Brooks Brothers, Lori Coulter, and C&A have produced custom-made garments using measurements taken from a 3D body scanner. By providing fit that is individualized on the basis of the customer's objective body measurements, these apparel companies provide improved fit for each customer.

Other apparel companies have created online custom clothing services by having the customer self-report his or her measurements. Archetype Solutions is a representative service provider for online made-to-measure apparel companies. They have developed a simple and intuitive ordering process that allows the consumer to order a garment based on their self-measurements, perceived body shapes, and style preferences in a few minutes over the internet. JCPenney, Land's End, QVC, and indiDenim have utilized similar ordering processes for women/men's Chino pants or jeans, or men's dress shirts.

In the apparel industry, body type, sometimes referred to as "body shape," has increasingly been recognized as a fundamental factor to a good fit. Apparel companies such as Gap Inc. and The Limited provide 'Straight' and 'Curvy' pants styles for customers with different lower body types. Zafu is an online size selection company which offers recommendations on which jeans are likely to fit the user best among 90 denim brands on the basis of a user's body shape and previous fit problems with their jeans. Zafu spent over six years researching and understanding body types, tested hundreds of pairs of jeans on 11,500 women, and developed a 'shape matching' technology. They found that women with identical hip measurements can have totally different body types, resulting in different fit problems. Only 6% of women have the same body type as the typical tall and slim fit model, but the problem is that most jeans companies consider these women 'average'. Zafu claims that their body type-based recommendations make it possible for 94% of 5,872,964 users to find their "perfect" jeans, but online return rates of apparel merchandise are generally about 50%.

Body type is also recognized to be a factor in creating custom-fit solutions. Staples was the first researcher in the U.S. to create different patterns designed for different body types for base block patterns while developing U.S. army men's dress uniforms in 2000. In Archytype's custom ordering process, customers are asked to specify their own body type from pictures of basic silhouettes and a text description in addition to their self-reported measurements. Automated made-to-measure computer-aided design programs (e.g., AccuMark MTM of Gerber Scientific, FitNet of Lectra Systems, and MtM.assyst of Assyst GmbH), may also benefit from use of body type information Simmons, Istook, and Devarajan felt that customization could be improved if it started from the most correctly shaped garment for each customer's body type. Ashdown and Dunne noted that the accuracy of body chart data, reliability of body measurement data, and fit preferences are critical elements in a system designed to automate patternmaking (Ashdown, S. P., and Dunne, L., A Study of Automated Custom Fit: Readiness of the Technology for the Apparel Industry, Clothing Textiles Res. J. 24(2), 121-136 (2006)). However, even after three iterative corrections of all these issues, these researchers found that only seven of ten custom-made garments from the system provided good fit. This limitation of automated custom system was also observed previously by the inventors when they worked with two large sportswear companies to develop automated custom-made systems for jacket and pant styles. Existing systems could not generate custom-made patterns with consistent good fit for these garments even after corrections of all issues enumerated in Ashdown and Dunne's study. In the custom jacket studies, when the hip girth was determined as a primary measurement for initiating the custom fit process, the fit at the bust was poor although the fit at the hip was appropriate. In contrast, when the bust girth was set as a primary measurement, the fit at the bust was appropriate, but the fit at the hip was not good. The custom-made clothing had especially poor fit for those people with a body type different from that of the fit model for the base pattern, resulting in a different silhouette, since this situation created the need for an extreme pattern alteration in a specific area.

Citation or identification of any reference in Section 2, or in any other section of this application, shall not be considered an admission that such reference is available as prior art to the present invention.

3. SUMMARY OF THE INVENTION

A computer-based method is provided for categorizing body shape comprising the steps of:

providing a data set of body shape-defining measurements of a portion of the body of interest from a plurality of subjects' bodies, wherein the measurements define a silhouette and profile (front and side) perspectives of the portion of the body of interest;

conducting a principal component (PC) analysis of the data set of measurements to calculate and generate PC scores;

conducting cluster analysis using the PC scores as independent variables to produce cluster analysis results; and establishing one or more body shape categories from the cluster analysis results, thereby categorizing body shapes of the plurality of subjects.

In one embodiment, the method can comprise the step of identifying different body shapes from the cluster analysis results.

In another embodiment, the body shape-defining measurements are derived from 3D body scans.

In another embodiment, the body shape-defining measurements are selected from the group consisting of girth, width, front arc, back arc, front depth, back depth, length, length proportion and drop value between two measurements of primary body locations.

In another embodiment, primary body locations from which shape-defining measurements can be taken can include, but are not limited to, upper body areas such as chest, bust, underbust, acromion and shoulders; lower body areas such as waist, high hip, hip, crotch, buttocks and abdomen; areas of the extremities such as thigh, kneecap, calf, ankle, foot, bicep, elbow, forearm and wrist; and neck and head.

In another embodiment, the method can comprise the step of conducting a discriminant analysis to classify body shapes identified from the cluster analysis results.

In another embodiment, the method can comprise the step of identifying one or more discriminant functions that define body shape category.

In another embodiment, the method can comprise the step of calculating one or more discriminant function score from an individual subject, thereby determining the individual subject's body shape category.

In another embodiment, the method can comprise the step of determining a range of discriminant function scores for each body shape group.

In another embodiment, the method can comprise the step of calculating one or more discriminant function scores from the body-shape defining measurements of the individual subject.

In another embodiment, the method can comprise the step of comparing the individual subject's calculated discriminant function scores with the range of discriminant function scores for each body shape group.

In another embodiment, the method can comprise the step of utilizing multiple measurements that categorize silhouette and profile views of the body simultaneously.

In another embodiment, the method can comprise the step of using drop values of body-shape defining measurements.

In another embodiment, the body-shape defining measurements are derived from 3D body scans.

In another embodiment, the method can comprise the step of utilizing a buttocks angle and a plurality of proportional measures of widths, depths, front/back depths, girths, and/or front/back girths of lower body locations of interest.

In another embodiment, the method can comprise the step of categorizing one or more lower body shape groups by K-means cluster analysis using one or more PC scores and/or one or more z-scores.

A shape prototyping system is also provided for designing a custom fit garment for an individual subject. In one embodiment, the system can comprise:

(a) a data set of body-shape defining measurements (e.g., widths, breadths, depths, arc measurements, circumferences, angles, and proportions of these measures) from a plurality of people representative of a population of interest to characterize the spectrum of body shapes and postures for which the custom fit garment is to be designed (b) a computer-based method for analysis of the measurements, wherein the computer-based method determines one or more prototype body shapes that identify or quantify a spectrum of shapes and postures that represent the population of interest;

(c) an adaptable guiding pattern for creating a parameterized pattern, wherein the adaptable guiding pattern comprises a structural form and a set of customizable distance and angle parameters, and wherein parameter values are matched to dimensions of the individual subject so that the parameterized pattern will specify a good-fit garment for the individual subject;

(d) computer-based method for creating a set of modified guiding patterns from the adaptable guiding pattern wherein each of the set of modified guiding patterns is matched to each of the prototype body shapes identified in (b);

(e) a method for identifying the appropriate body-shape prototype guiding pattern for the individual subject's set of body shape-defining measurements; and (f) a method for producing a parameterized pattern from a modified guiding pattern, comprising the step of establishing the modifying guiding pattern distance and angle parameters for the selected guiding pattern from the individual subject's set of body shape-defining measurements.

In one embodiment, the method of (f) can comprise a method for producing a conventional pattern from which the custom-fit garment can be made from the parameterized pattern.

In another embodiment, the computer-based method of (b) comprises conducting principle component (PC) analysis of the body shape-defining measurements to derive principle components (PCs) and conducting an unsupervised clustering algorithm on the PCs.

In another embodiment, the method of (f) is refined empirically by analyzing a range of size adjustments and/or using a panel of experts to determine good-fit outcomes by observing garment fit on a set of fit models.

A system for computer-assisted designing of a custom fit garment for an individual subject is also provided. In one embodiment, the system can comprise:

(a) an adaptable guiding pattern, wherein the adaptable guiding pattern comprises a structural form and a set of customizable distance parameters for creating a parameterized pattern, and wherein the values of the parameters are matched to body shape (i.e., detailed dimensions) of the subject so that the parameterized pattern specifies a good-fit garment for that individual;

(b) a machine learning system for predicting a set of subject distance parameters for the guiding pattern given a set of body-shape defining measurements taken from the subject;

(c) a computer algorithm for combining a subject's distance parameters with the structural form of the guiding pattern to produce a conventional pattern from which the custom-fit garment can be made; and (d) a documented database for training the machine learning system, wherein the documented database is associated with each modified guiding pattern, and wherein the database comprises multiple tuples of distance parameter values, associated distance parameters, and good-fit outcomes.

In one embodiment, the guiding pattern can be altered to correct and balance the pattern for a specific body type.

In another embodiment, the documented database comprises good and poor good-fit outcomes.

In another embodiment, the documented database is created by testing a range of predictions and/or using a panel of experts to determine good-fit outcomes by observing garment fit on a set of fit models.

A method for shape prototyping for design of custom fit clothing is also provided. In one embodiment, the method can comprise the steps of:
(a) providing a full set of body measurements (widths, breadths, depths, arc measurements, circumferences, angles, and proportions of these measures) from a plurality of people, wherein the plurality is representative of a population of interest and wherein the full set of body measurements from the plurality is representative of a spectrum of body shapes and postures for which a garment is to be designed;
(b) computer-analyzing the full set of body measurements, wherein the analyzing step comprises the step of determining one or more prototype body shapes and wherein the prototype body shape quantifies the body measurements of a subset of the members of the plurality of people;
(c) providing a first adaptable guiding pattern, wherein the first adaptable guiding pattern comprises a structural form and a set of customizable distance and angle parameters; and
(d) producing a parameterized pattern, wherein the producing step comprises matching the values of the customizable distance and angle parameters of the adaptable guiding pattern to corresponding values derived from an individual person of interest (e.g., a customer) and wherein the parameterized pattern specifies a good-fit garment for the individual person of interest.

In one embodiment, the method can further comprise, between step (c) and step (d), the step of:
creating a set of modified adaptable guiding patterns from the first adaptable guiding pattern, wherein each modified guiding pattern in the set is matched to one of the one or more prototype body shapes identified in (b).

A system for shape prototyping for design of custom fit clothing is also provided. In one embodiment, the system can comprise:
(a) a full set of body measurements (widths, breadths, depths, arc measurements, circumferences, angles, and proportions of these measures) from a plurality of people, wherein the plurality is representative of a population of interest and wherein the full set of body measurements from the plurality is representative of a spectrum of body shapes and postures for which garments are to be designed;
(b) a method for analyzing these measurements using a computer, wherein the method comprises the step of determining one or more prototype body shapes, wherein the prototype body shape quantifies the body measurements of a subset of the members of the plurality of people;
(c) an adaptable guiding pattern, wherein the adaptable guiding pattern comprises a structural form and a set of modifiable (customizable) distance and angle parameters, wherein the values of the modifiable (customizable) distance and angle parameters can be matched to detailed dimensions of an individual person of interest (e.g., a customer), thereby yielding a parameterized pattern customized for the individual person of interest; and
(d) the parameterized pattern, wherein the parameterized pattern specifies a conventional pattern for a good-fit (or custom-fit) garment for the individual person of interest.

A computer-based method is also provided for identifying the appropriate body-shape prototype guiding pattern for an individual person's (e.g., customer's) set of measurements. In one embodiment, the method comprises the step of computer-analyzing a full set of body measurements wherein the step of computer-analyzing comprises the steps of:
conducting a principle component analysis (PCA) of all measurements in the set of body measurements;
obtaining principle component measurements from the PCA; and
performing an unsupervised clustering algorithm on the most significant principle components, thereby obtaining one or more prototype body shapes.

The full set of body measurements (widths, breadths, depths, arc measurements, circumferences, angles, and proportions of these measures) can be obtained from a plurality of people, wherein the plurality is representative of a population of interest and wherein the full set of body measurements from the plurality is representative of a spectrum of body shapes and postures for which garments are to be designed. An individual person's measurements may be taken by hand or by using computer analysis of a 3D body scan.

A computer-based method is also provided for producing a conventional pattern from which a custom-fit garment can be made for an individual person of interest (e.g., a customer). In one embodiment, the method can comprise the steps of:
producing a parameterized pattern comprising determining distance and angle parameters for an adaptable guiding pattern from a set of measurements from the individual person, and producing a conventional pattern from the parameterized pattern.

4. BRIEF DESCRIPTION OF THE DRAWINGS

The present invention is described herein with reference to the accompanying drawings, in which similar reference characters denote similar elements throughout the several views. It is to be understood that in some instances, various aspects of the invention may be shown exaggerated or enlarged to facilitate an understanding of the invention.

FIG. 1. Examples of body shape-defining characterizations and measurements: Waist Front X, Waist Back X, Buttocks Back X, Abdomen Front X, Side seam line. Depth measurement, i.e., the distance between the abdomen prominence point and buttocks prominence point, can be calculated by subtracting 'Buttocks Back X' from 'Abdomen Front X'.

Figure 2:
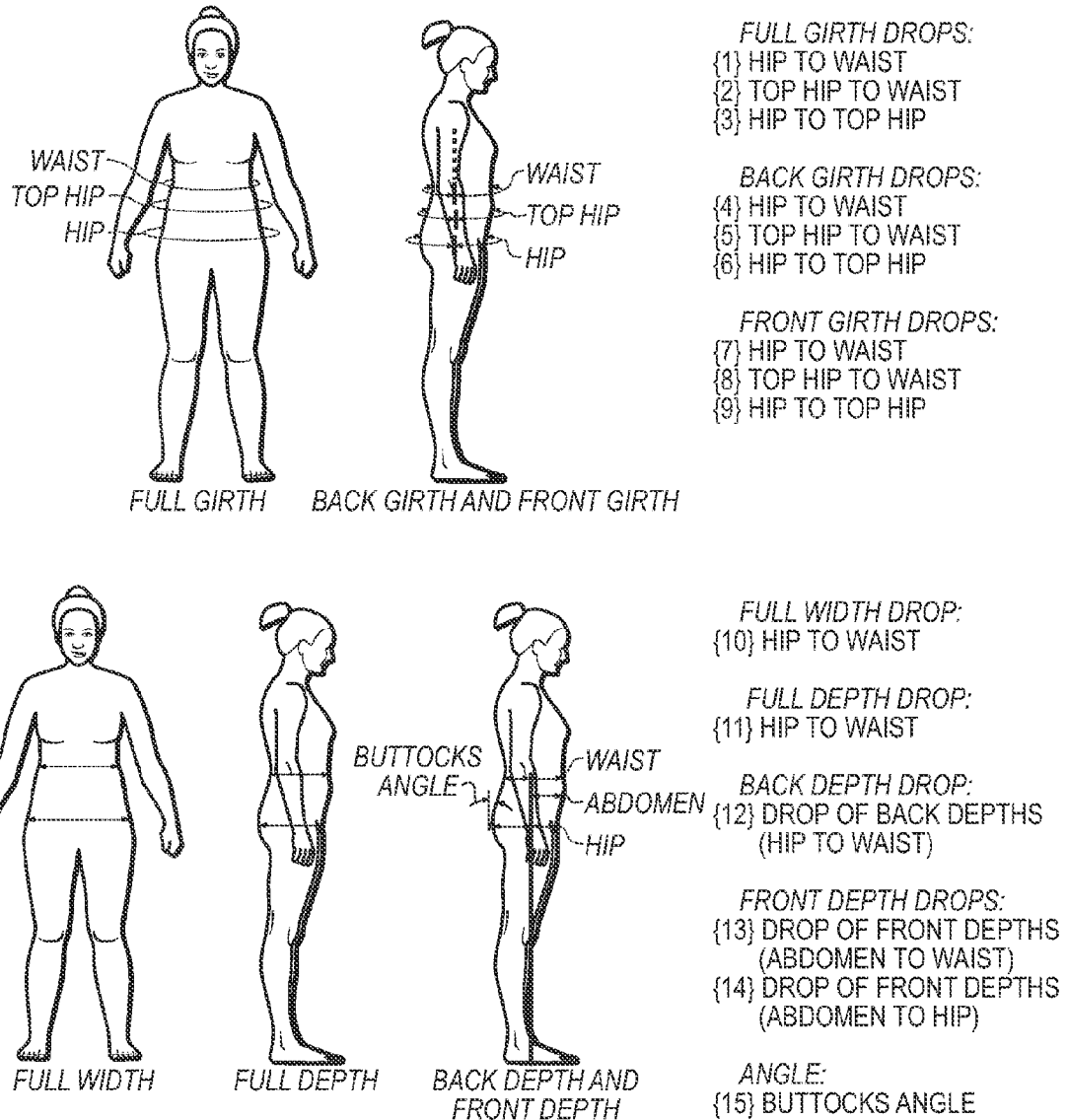

FIG. 2. Measurement procedures and landmarks used to derive SizeUSA data from body scans for the measurements used in the final analysis described in Section 6.1, Example 1. A total of 14 drops and 1 angle were calculated: Drop values of girths (hip to waist, top hip to waist, and hip to top hip {1-3}), drop values of back arcs (hip to waist, top hip to waist, and hip to top hip {4-6}), drop values of front arcs (hip to waist, top hip to waist, and hip to top hip {7-9}), drop values of widths (hip to waist {10}), drop values of depths (hip to waist {11}), drop value of back depths (hip to waist {12}), and drop values of front depths (abdomen to waist, and abdomen to hip {13-14}), and buttocks angle {15}.

Figure 3:
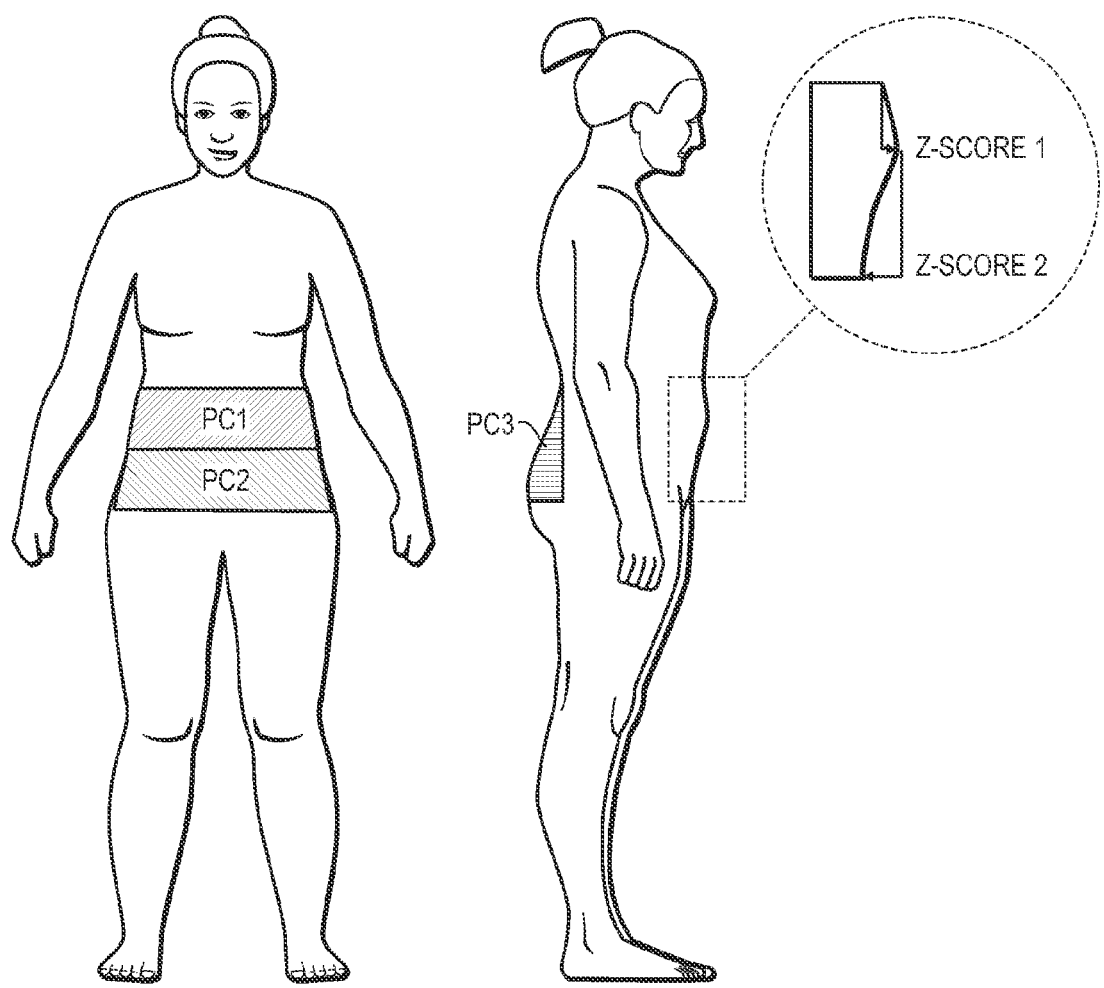

FIG. 3. Each principal component (PC) can clearly represent a distinctive shape from either the silhouette or profile view of the body. In the embodiment shown here, PC1, PC2, PC3, Z-score 1 and Z-score 2 are indicated.

Figure 4:
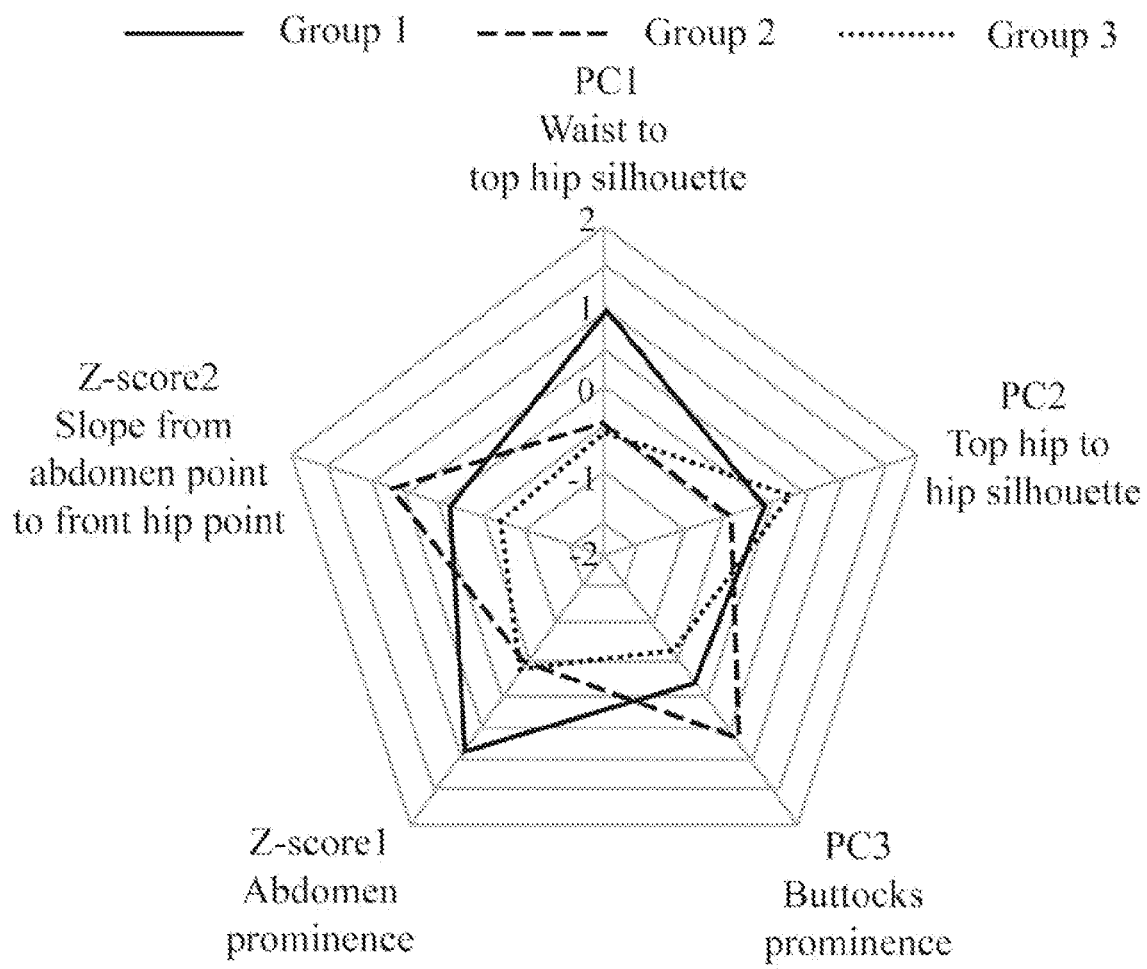

FIG. 4. Diagram showing how the means of each principal component (PC) and z-scores compare among the three body shape groups described in Section 6.1, Example 1.

Figure 5:
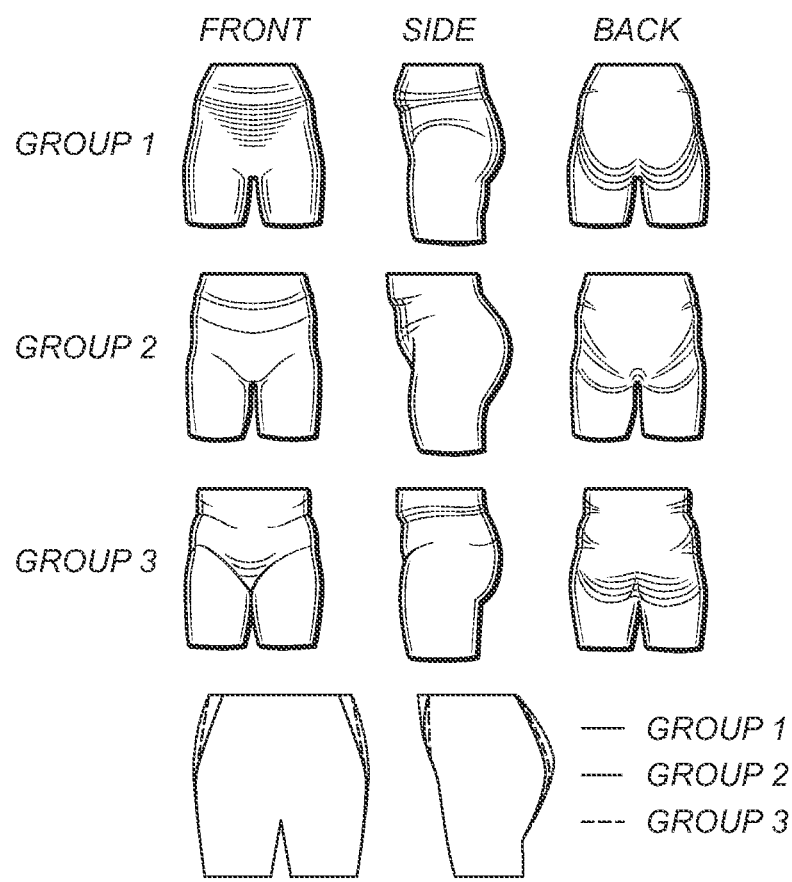

FIG. 5. Three-dimensional (3D) images of fit model examples discussed in Section 6.1, Example 1. To generate fit model examples, 3D scan files were selected that represent each body shape. The 3D images were manipulated and refined to represent each silhouette in the three directions (front/side/back) most effectively. These silhouettes were adjusted to match the calculated average key measurements for each group. Front silhouettes and profile sketches of each lower body shape group are also shown for comparison.

Figure 6:
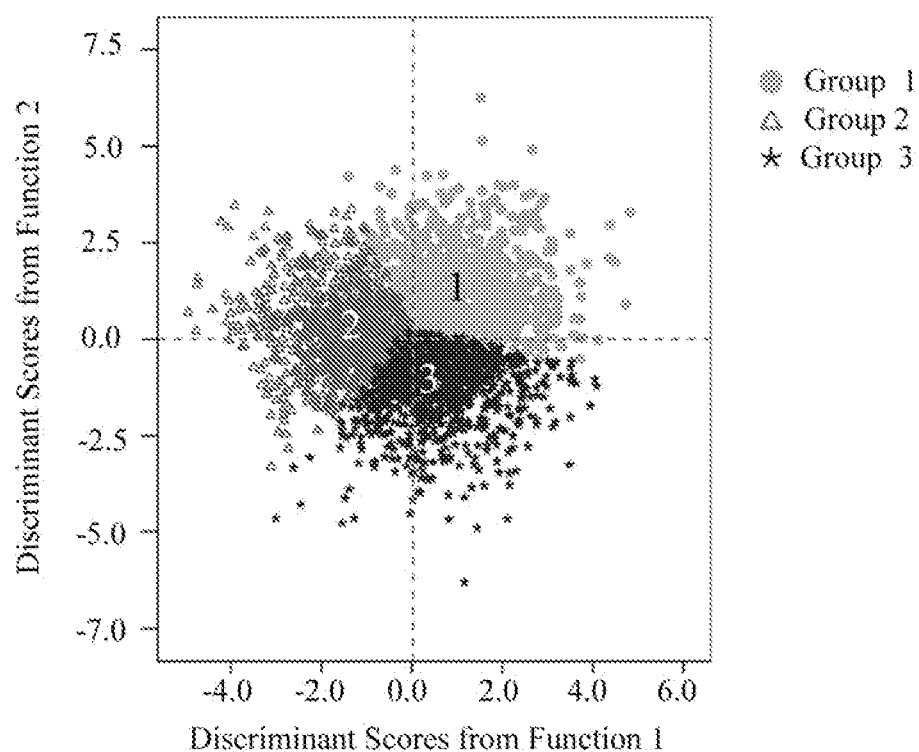

FIG. 6. Scatterplot for predicting an individual's group membership in Group 1, 2 or 3 as described in Section 6.1, Example 1. A new person's group membership can be predicted by calculating her Discriminant Score from Function 1 (DF1) score and Discriminant Score from Function 2 (DF2) score, and comparing these scores with this scatterplot. Group 1 tends to have a positive DF1 score and a positive DF2 score. Group 2 has a negative DF1 score, but the DF2 score can be either positive or negative. Group 3 can have either a positive or negative DF1 score, but a negative DF2 score.

FIG. 7. Table 1. Measurement procedures and body landmarks. See Section 6.1, Example 1 for details.

FIG. 8. Table 2. Descriptive statistics of 15 body shape variables. For mean and range of 14 variables (except for buttocks angle), 'inch' unit is also added in parentheses next to 'centimeter' unit. Table 3. Size distribution of subjects aged 18 to 35 in SizeUSA data. For waist girth and hip girth, 'inch' unit is also added in parentheses next to 'centimeter' unit. See Section 6.1, Example 1 for details.

FIG. 9. Table 4. Total variance explained from Pre-PCA1. The total amount of variations in the sample is 15. Table 5. Rotated component matrix of Pre-PCA1. See Section 6.1, Example 1 for details.

FIG. 10. Table 6. Rotated component matrix of Pre-PCA2 with 12 variables retained. Table 7. Rotated component matrix of Final PCA. See Section 6.1, Example 1 for details.

FIG. 11. Table 8. Mean and standard deviation of PC and z-score variables for three body shape groups. Means were ranked by a, b, and c ordered by the magnitude of the value. * p<0.05. See Section 6.1, Example 1 for details.

FIGS. 12A-B. Table 9. Mean and standard deviation of three body shape groups on twelve body measurements. Means were ranked by a, b, and c ordered by the magnitude of the value. For mean of 12 variables (except for buttocks angle), 'inch' unit is also added in parentheses next to 'centimeter' unit. * p<0.05. See Section 6.1, Example 1 for details.

FIG. 13. Table 10. Cross tabulation of age group and body shape group. Table 11. Cross tabulation of ethnic group and body shape group. See Section 6.1, Example 1 for details.

FIG. 14. Table 12. Wilks' Lambda. Table 13. Eigenvalues of functions. Table 14. Canonical discriminant function coefficients. See Section 6.1, Example 1 for details.

FIG. 15. Table 15 Classification results. Overall 97.5% of original grouped cases were correctly classified.

Figure 16A:
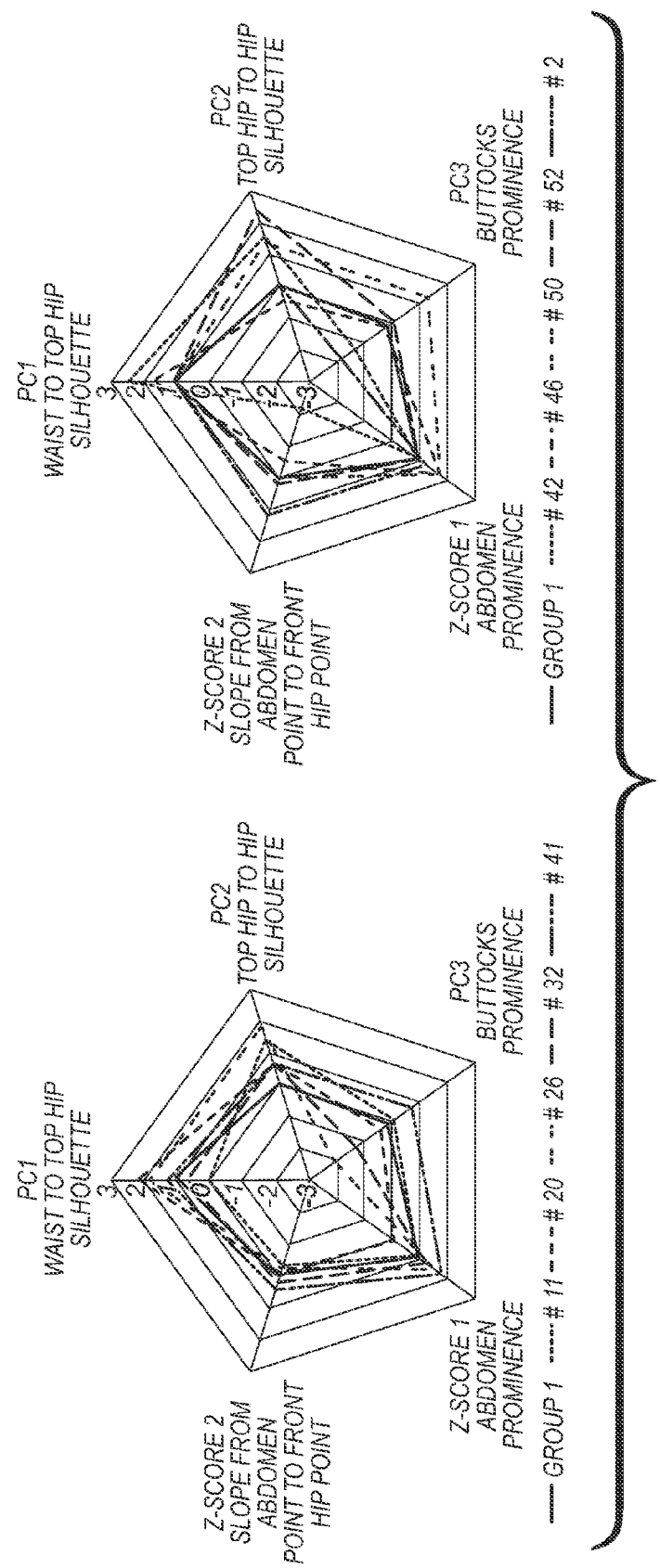
Figure 16B:
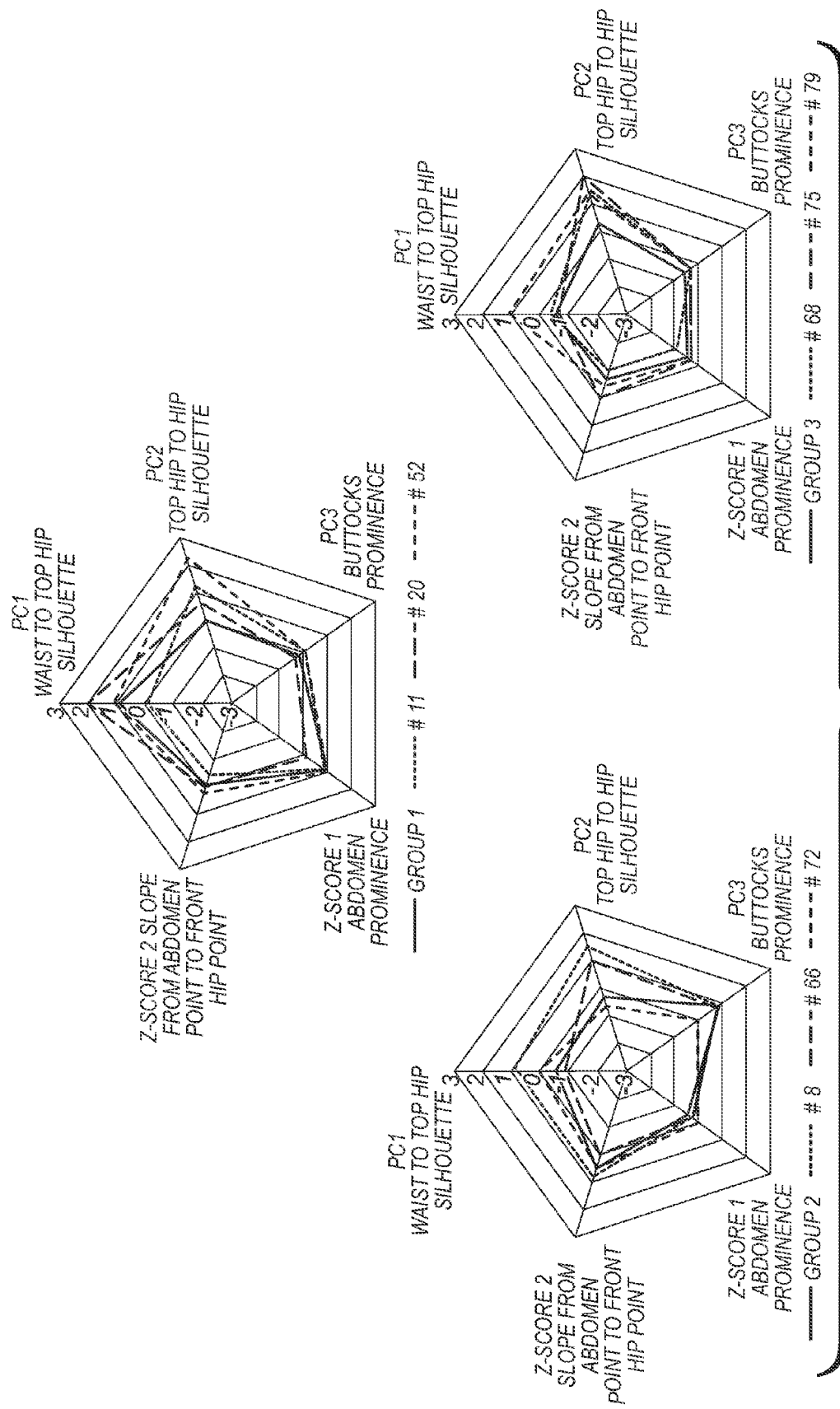

FIGS. 16A-B. (a) Pentagonal graphs of 10 fit model candidates among participants in group 1, (b) Pentagonal graph of fit models of body group 1, 2, and 3.

Figure 17:
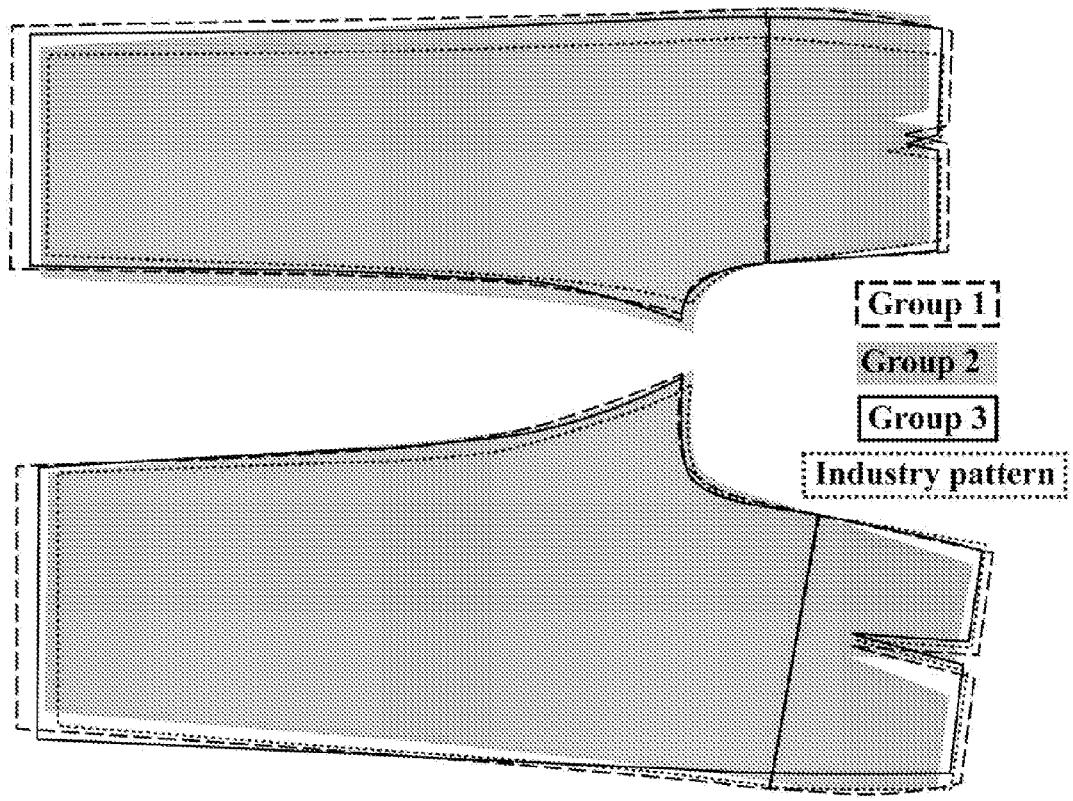

FIG. 17. Diagram of final three block patterns and industry pattern.

FIG. 18. Selected front, side and back view photos. Type A: Pants made by body shape driven customization method. Type B: Pants made by standard customization method.

FIG. 19. Table 16. F-values and means of overall fit derived from linear mixed models (LMM). 5-point scale for overall fit: 1 (very bad), 2 (bad), 3 (neutral), 4 (good), and 5 (very good). Type A: Pants made by body shape driven customization method. Type B: Pants made by standard customization method. Table 17. Expert judges' evaluation: p-values and means of fit scores at body locations derived from generalized estimating equations (GEE). 2-point scale for fit: 0 (bad fit) and 1 (good fit). Type A: Pants made by body shape driven customization method, Type B: Pants made by standard customization method. Cells of effects that had significance (p<0.05) are shaded. Fonts are bold if type A had higher fit ratings than B.

FIG. 20. Table 18. Expert judges' evaluation: Pairwise comparison of means of fit scores of types according to groups derived by paired t-test. 2-point scale for fit: 0 (bad fit) and 1 (good fit). Cells of effects which had significance (p<0.05) were shaded, and fonts were bolded if type A had higher fit ratings than B.

Figure 21:
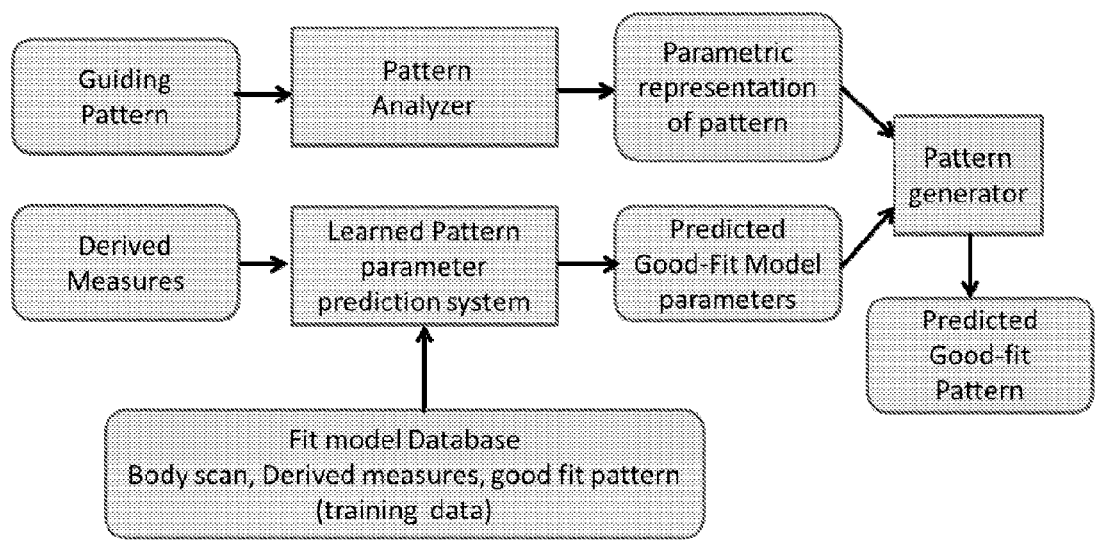

FIG. 21. Flow diagram showing system organization for automated good-fit customization.

Figure 22:
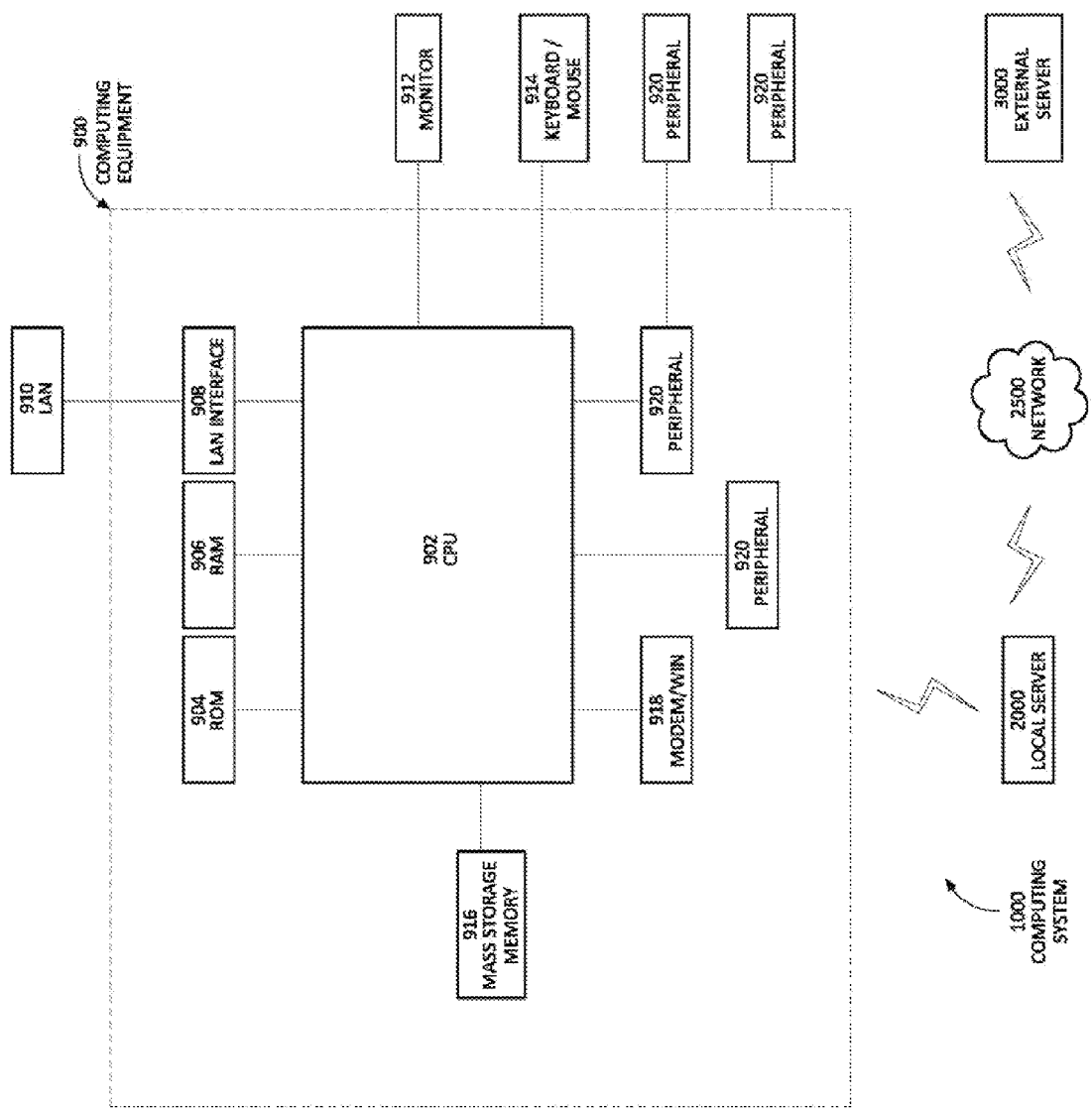

FIG. 22. Schematic diagram of a computing device which can be used in connection with the methods disclosed herein.

5. DETAILED DESCRIPTION OF THE INVENTION

A categorization method for lower body shapes is provided, which uses principal component analysis (PCA) and cluster analysis for identifying body shapes reliably and objectively. In one embodiment, a computer-based method for categorizing body shape is provided comprising the steps of:

providing a data set of body shape-defining measurements of a portion of the body of interest from a plurality of subjects' bodies, wherein the measurements define a silhouette and profile (front and side) perspectives of the portion of the body of interest;

conducting a principal component (PC) analysis of the data set of measurements to calculate and generate PC scores;

conducting cluster analysis using the PC scores as independent variables to produce cluster analysis results; and establishing one or more body shape categories from the cluster analysis results, thereby categorizing body shapes of the plurality of subjects.

The method uses multiple measurements that can categorize silhouette and profile views of the body simultaneously. In another embodiment, the measurements can be derived from body scan data. Use of drop values of complex body measurements derived from 3D body scans make it possible to use PCA to identify components that classify body shape and not size.

In another embodiment, the method uses buttocks angle and fifteen proportional measures of widths, depths, front/back depths, girths, and front/back girths of key lower body locations. In another embodiment, lower body shape groups can be categorized by K-means cluster analysis using three PC scores and two z-scores, and all individuals can be assigned to one of three lower body shape groups. In another embodiment, to classify the body shape of an individual from body scan measurements, a discriminant analysis is conducted and discriminant functions consisting of several raw measurements are developed. In a specific embodiment, an individual is classified by calculating their function scores and comparing them with the range of function scores of each body shape group. This method can be used to classify any body shape known in the art, including but not limited to, lower body shapes, upper body shapes and body shapes of target markets of different ages, sexes, or ethnicities.

For clarity of disclosure, and not by way of limitation, the detailed description of the invention is divided into the subsections set forth below.

5.1 Methods for Body Shape Categorization

A method for body shape categorization is provided. This method can be employed, for example, in a system for altering differently shaped block patterns to correct and balance the patterns for a specific body type. The method and system improve the automated customization system for automated custom patternmaking and can be used to categorize body shape of people of different ages, sexes, or ethnicities.

By way of background, traditional methods of fitting and pattern alteration are well known in the art (see, e.g., Liechty, E. G., Pottberg, D. N., & Rasband, J. A. (1992). Fitting and Pattern Alteration: A Multi-Method Approach. New York: Fairchild Fashion and Merchandising Group). Further by way of background, four major methods female body shape categorization are known in the art: (a) proportions of front and/or side silhouettes (Connell, L. J., Ulrich, P. V., Brannon, E. L., Alexander, M., and Presley, A. B., Body Shape Assessment Scale: Instrument Development for Analyzing Female Figures, Clothing Textiles Res. J. 24(2), 80-95 (2006)), (b) proportions of body circumference measurements (Staples N. J., Fit 2000: The Fit Symposium, 2000 [accessed August, 2001], http://car.clemson.edu/fit2000), (c) linear multiple regression analysis (O'Brien, R., and Shelton, W. C., Women's Measurements for Garment and Pattern Construction, Bureau of Home Economics, Textiles and Clothing Division, Miscellaneous Publication, No. 454, US Department of Agriculture and Work Projects Administration, Washington, D.C., USA (1941); Churchill, E., Churchill, T., McConville, J. T., and White, R. M., Anthropometry of Women of the U.S. Army-1977, Report no. 2, U.S. Army Research and Development Command, USA (1977)), or (d) principal component analysis (Green, M. E., An application of U.S. Army Women's Anthropometric Data to the Derivation of Hypothetical Sizing/tarrifing Systems, Clothing Res. J. 9, 16-32 (1981); Salusso-Deonier, C. J., Delong, M. R., Martin, F. B., and Kohn, K. R., A Multivariate Method of Classifying Body Form Variation for Sizing Women's Apparel, Clothing Textiles Res. J. 4(1), 38-45 (1985); Salusso, C. J., Borkowski, J. J., Reich, N., and Goldsberry, E., An Alternative Approach to Sizing Apparel for Women 55 and Older, Clothing Textiles Res. J. 24(2), 96-111 (2006)). No equivalent studies of male body type have been conducted. Tailor's methods exist based on subjective analysis and experience fitting a range of body types that focus on posture (such as rounded shoulders) or basic linear body proportions (see, e.g., Boswell, S., 1993, Menswear: Suiting the Customer. Regents/Prentice Hall, NJ.

The first method (a) is related to the visual method of shape determination. A method described by Connell et al. (Connell, L. J., Ulrich, P. V., Brannon, E. L., Alexander, M., and Presley, A. B., Body Shape Assessment Scale: Instrument Development for Analyzing Female Figures, Clothing Textiles Res. J. 24(2), 80-95 (2006)) developed nine scales for body shape assessment from front and side views. Three scales (body build, body shape, and posture) were for whole body analysis, and six scales (front torso shape, hip shape, shoulder slope, bust shape, buttocks shape, and back curvature) were for analysis of component body parts. Only one body projection onto the view plane can be evaluated at a time, and therefore the analysis can be misleading, as bodies with the same front projection can have significantly different side projections and vice versa. Traditional garment pattern construction relies on circumferential and arc body measurements. Therefore, body shape categorization with comparisons of widths and depths from the view plane are not as directly related to patternmaking as categorization based on body circumferences.

The second method of categorization (b) is based on circumference measurement ratios between bust, waist, high hip, abdomen, and hip. Simmons created one body shape categorization system of this type (Simmons, K. P., Istook, C. L., and Devarajan, P., Female Figure Identification Technique (FFIT) for Apparel, Part II: Development of Shape Sorting Software, J. Fashion Mark. Manage. 4(1), 1-15 (2004)). However, bodies with the same circumferential proportions may differ in width/depth proportion, or in some other shape-defining measurements, such as angles, or anterior/posterior variation defined in arc measurements, rendering the circumferential proportion definition unable to differentiate shapes completely (Watkins, S. M., "Clothing: The Portable Environment," (2nd Edn.), Iowa State University Press, Iowa, USA (1995)). A more elaborate combination of circumference/arc proportions along with width/depth proportions may be needed to define lateral body shape fully.

The third method (c), which uses multiple regression analysis to define body shape, is based on the assumption that people have a certain combination of measurements at key body locations. Two key dimensions are selected to identify body type (e.g., stature, bust girth, waist girth or hip girth) by the drop, or the difference between the two dimensions to represent a specific body proportion. Other body measurements are then calculated from these initial key dimensions using multiple regression functions. Most current sizing systems are made using this method. The International Organization for Standardization (ISO) published Technical Report ISO/TR 10652:1991 presenting guidelines for creating a sizing system based on anthropometric data of a particular population for nations. They classified figure types based on bust to hip drop values into A type (9 cm), M type (4 to 8 cm), and H type (3 to −4 cm or greater) (International Organization for Standardization, ISO/TR 10652, Standard sizing systems for clothes (1991)). Several countries such as Germany, Japan, Korea and Hungary utilized this method for creating their national sizing systems. In Germany, the height and hip types defined nine figure types. Heights were grouped into average height, short and tall. Each group is divided into three hip types; slim hip, average, and full hip type (DOB-Verband, Women's outer garment size chart (1983)). Japanese Standards Association defined body shapes by height and bust to hip drop (A, Y, AB, and B) (JIS L 4005:2001 Sizing Systems for Women's Garments) (Japanese Standards Association, JIS L 4005:2001 Sizing systems for women's garments (2001)). Korea also classified body types by height and bust to hip drops (KS K0051:2009 Sizing systems for female adult's garments) (Korean Standard Association, KS K 0051:2009 Sizing systems for female adult's garments (2009)). This method is limited in the number of measurements that can be used for body categorization.

The last method (d) utilizes principal component (PC) analysis, which reduces the number of variables by combining similar variables into new composite dimensions called principal components (PCs). Previous work using this method has utilized girths, front/back arcs, lengths, and heights as independent variables for the whole body shape analysis, and the result showed that PC1 and PC2 were related to either horizontal measurements or vertical measurements (Green, M. E., An application of U.S. Army Women's Anthropometric Data to the Derivation of Hypothetical Sizing/tarrifing Systems, Clothing Res. J. 9, 16-32 (1981); Salusso-Deonier, C. J., Delong, M. R., Martin, F. B., and Kohn, K. R., A Multivariate Method of Classifying Body Form Variation for Sizing Women's Apparel, Clothing Textiles Res. J. 4(1), 38-45 (1985); Salusso, C. J., Borkowski, J. J., Reich, N., and Goldsberry, E., An Alternative Approach to Sizing Apparel for Women 55 and Older, Clothing Textiles Res. J. 24(2), 96-111 (2006)). A combination of PC1 and PC2 could represent different body shapes. However, this analysis tended to collect most of vertical measurements (heights and lengths) under one PC, and most of the horizontal measurements (girths and front/back arcs) under the other PC, which resulted in specific body shape characteristics such as waist and hip relationships not being distinguished from one another.

As discussed above, each of the current methods of categorizing body shape is limited in some aspects. A method of body shape categorization is provided herein that combines both front and side perspectives of the body, that distinguishes many different body relationships, and that uses objective body measurements. According to the method, principal component (PC) analysis is used to extract distinctive shapes that describe and categorize the body fully in all dimensions.

In one embodiment, the method for categorizing body shape comprises the steps of:

providing a data set of body shape-defining measurements of a portion of the body of interest from a plurality of subjects' bodies, wherein the measurements define a silhouette and profile (front and side) perspectives of the portion of the body of interest;

conducting a principal component (PC) analysis of the data set of measurements to calculate and generate PC scores;

conducting cluster analysis using the PC scores as independent variables to produce cluster analysis results; and establishing one or more body shape categories from the cluster analysis results, thereby categorizing body shapes of the plurality of subjects.

In another embodiment, the method comprises the step of (1) classifying the shape of one particular section or portion of the body, e.g., the lower body shape, rather than whole body shape. For example, lower body shape can be classified because: (a) customers are the least satisfied with the fit of pants compared to all other apparel items (Charoensiriwath, S., and Spichaikul, P., Constructing Thailand's National Anthropometrics Database Using 3d Body Scanning Technology, in "Proceedings of Pacific Neighborhood Consortium Conference", Taipei, Taiwan, 2009 [accessed April 2010], http://www.pnclink.org/pnc2009/chinese/Abstract/08-Unfoldinge-Culture/08_UnfoldingeCulture_Abstract_PiyawutSrichaikul.pdf; DOB-Verband, Women's outer garment size chart (1983)) and (b) many of the made-to-measure apparel companies currently provide pants as a custom garment style ([TC]$^2$, Custom Clothing, 2009 [accessed April 2010], http://www.tc2.com/news/3 dbody.html).

The method can also comprise the step of including various types of shape-defining measurements, such as width, front/back depth, arc measurements and the drop values between measurements of primary body locations (i.e., body landmarks or locations of interest) instead of simple circumference and length measurements. Primary body locations from which shape-defining measurements can be taken are well known in the art, and include, but are not limited to, upper body areas such as chest, bust, underbust, acromion and shoulders; lower body areas such as waist, high hip, hip, crotch, buttocks and abdomen; areas of the extremities such as thigh, kneecap, calf, ankle, foot, bicep, elbow, forearm and wrist; and neck and head.

Cluster analysis can be conducted using the principal component scores as independent variables to identify different body shapes and create body shape categories.

A method is also provided for defining a new person's body shape group. A discriminant analysis can be conducted and discriminant functions consisting of the appropriate body measurements can be developed. This system provides simple formulas for classification of an individual in a body shape group, making it possible to compare their calculated function scores with the range of function scores of each body shape group.

Measurement Selection

Although the following discloses methods for analyzing a dataset comprising measurements obtained from women, it will be appreciated by the skilled artisan that a dataset comprising measurements from men, boys or girls can also be employed and analyzed.

In a specific embodiment, a dataset comprising measurements from women aged 18 to 35 can be employed (e.g., the SizeUSA dataset (McConville, J. T., "Anthropometry in Sizing and Design", Chapter VIII in Anthropometric Source Book, Nasa Reference Publication 1024, Volume 1: Anthropometry for Designers, National Aeronautics and Space Administration, Washington, D.C., USA (1978)). Measurements that are related to lower body shape analysis are selected on the basis of two considerations: (a) front/back arcs, widths, and front/back depths should be included for more specific categorization of both silhouette and profile of the lower body, unlike previous body shape analysis methods based on ratios or drops of girth measurements only, (b) measurements should be useful for application to pants pattern making. Width and depth measurements are difficult to apply to a traditional pattern making method, but they provide direct measures defining the silhouette and profile of the body. Therefore, all of these measures can be used: girths, front/back arcs, widths, and. Length measurements (waist to hip height, waist to abdomen height, and waist to crotch height) and length proportions (waist to hip height/waist to crotch height, and waist to abdomen height/waist to crotch height) can also be considered in calculations.

In one embodiment, only one depth measurement is used, the distance between the abdomen prominence point and buttocks prominence point, which can be calculated by subtracting 'Buttocks Back X' from 'Abdomen Front X' (FIG. 1). However, this measurement by itself may not represent the degree of abdomen prominence and buttocks prominence in relation to other body areas such as waist.

'Front X' and 'Back X' at the waist and hip level can be generated (FIG. 1). The side seam location can be determined by a plane centered at the mid-point between the abdomen prominence point and buttocks prominence point. Front depth, back depth, and full depth can be calculated at the waist level and hip level. Girth, front arc, and back arc at the waist level, top-hip level and hip level; girth at the max-thigh level; and buttocks angle measurement can be selected from the data set. In certain embodiments, other measurements, including length measurements can also be included in the analysis.

Section 6.1 (Example 1) sets forth an example of this method. Since the method focuses on body shape analysis regardless of body size, the strength of the relationship between weight (a representative measurement related to body size) and 33 variables (18 raw measurements and 15 drops) can be examined by running bivariate correlation analysis (e.g., by using the statistical package SPSS 17.0). If there is a weak linear relationship between weight and a measurement, it can be considered a shape-related variable.

Linear relationships such as a curvature relationships not revealed in single correlation calculation can also exist. Thus, a regression analysis can be conducted with weight as a dependent variable, and a variable and its square as independent variables. If r value is significantly high ($p<0.05$), the function [weight=$a+b \times$(variable)$+c \times$(variable)$^2$] can be judged to be meaningful; expressed as curvature relationships.

Sample Selection

In one embodiment, percentiles of BMI (Body Mass Index), waist girth measurement, and hip girth measurement can be calculated. Data can be sorted so that the dataset contains measurements only from individuals that fit in a desired clothing size range. Waist girth measurements and hip girth measurements of known clothing sizes can also be compared with the data set measurements. The percentile of BMI can be compared with known BMI categories. Body Mass Index (BMI) is a number calculated from a person's weight and height. BMI provides a reliable indicator of body fat and is used to screen for weight categories. BMI Categories: Underweight=<18.5, Normal weight=18.5-24.9, Overweight=25-29.9, Obesity=BMI value of 30 or greater (http://www.nhlbi.nih.gov/guidelines/obesity/index.htm).

Measurements from body shapes that belong in a size range other than the size range of interest can be eliminated. In addition, outliers, whose measurements exceed three times the standard deviation from the mean of the measurement can be removed.

Body Classification Method

Statistical methods for body classification can include principal component analysis (PCA) and cluster analysis. Principal component analysis is a mathematical procedure that transforms a number of possibly correlated variables into a smaller number of uncorrelated variables called principal components. Two major rotation systems for extracting principal components are available: Orthogonal and Oblique. The assumption of Orthogonal system is that each measurement is correlated to each component, but components are not correlated each other. On the other hand, the assumption of Oblique system is that each measurement is not correlated to each component, but components are correlated each other. In a preferred embodiment, Varimax rotation method, a representative method of Orthogonal coordinate system, can be used, since it provides independence among principal components. The decision on the number of components to be retained can be made with consideration of three aspects: (a) eigenvalues that correspond to the sum of the squared loadings for a principal component, (b) rotated component loadings, and (c) the number of variables that have high correlations with each component.

With respect to eigenvalues, principal components preferably have eigenvalues greater than 1.0 (Kaiser-Guttman's standard) (Warner, R. M., Applied Statistics: From Bivariate through Multivariate Techniques, Sage Publications, Los Angeles, USA (2008)) and they are preferably large enough to be distinguished from the rest of the principal components.

Each measurement should preferably have high component loadings (correlation) with one principal component. If a measurement is highly correlated with more than two components, the analysis can be re-conducted with this measurement removed.

Each principal component preferably has a minimum of three variables. If a component has less than three variables, the component should not be retained since it does not have enough indicator variables. However, for variables that are important for patternmaking and that represent a distinctive body shape in the body shape category/portion of body being analyzed (e.g., lower body shape), the z-score of the measurement can be calculated and used in the cluster analysis as an independent variable.

A z-score indicates how many standard deviations an element is from the mean. A z-score can be calculated from the following formula $[z=(X-\mu)/\sigma]$ where z is the z-score, X is the value of the element, $\mu$ is the population mean, and $\sigma$ is the standard deviation (Korean Standard Association, KS K 0051:2009 Sizing systems for female adult's garments (2009)). Z-score 1 was 'drop of front abdomen depth to waist front depth' and z-score 2 was 'drop of front abdomen depth to front hip depth'.

Using each principal component that clearly represents a distinctive shape from silhouette and profile views of the lower body, K-means cluster analysis can be conducted using the principal component scores as independent variables to categorize body shapes. In certain embodiments, data can be classified, for example, into two to five clusters. The final number of the clusters can be decided with the consideration of a having a similar number of people in each cluster, significant differences among clusters, and a reasonable number of clusters for the specific population and for the specific apparel-related outcome desired. To analyze whether clusters are significantly different from one another, each body measurement can be compared through Duncan's multiple range test of ANOVA post-hoc analysis.

An example of conducting a principal component analysis (PCA) is described in Section 6.1, Example 1.

In certain embodiments, once final variables are selected, an additional PCA can be performed with non-desired variables removed. PCs considered as appropriate for cluster analysis are saved in the dataset and used for the cluster analysis.

Cluster Analysis

K-means cluster analysis can be performed using final variable PC scores and z-scores as independent variables to categorize a body shape of interest. In a preferred embodiment, three clusters that are determined to be most efficient and/or appropriate to represent the body shape of interest are selected and a 3-cluster model conducted, as described in Section 6.1, Example 1, to categorize body shape group(s).

Three clusters may not be sufficient to fully represent complex body shapes. Under certain circumstances, it can be difficult to categorize the specific number of clusters since the data are continuous, resulting in difficulty in dividing groups into distinct clusters, an issue with any shape analysis system. However, three clusters, in certain embodiments, can be the most efficient cluster number when compared to two, four, or five clusters.

In other embodiments, these methods can be used to develop other body shape groups using different body measurements or different numbers of clusters.

Prediction Method

Discriminant analysis can be used to classify body shapes identified from the cluster analysis. The dataset preferably includes body shape group memberships coded by the cluster analysis as a 'grouping variable', and the measurements corresponding to principal components identified as 'independent variables'. The discriminant analysis can be performed by stepwise-method, and measurements of interest can be extracted that discriminate among groups. Once the discriminant functions are calculated, their significance and their percentage of the variances can be examined. To identify the rate of predictive accuracy of the discriminant functions in classifying body shapes, the original group membership identified from the cluster analysis and the predicted group membership from discriminant functions can be compared. Means of function scores and a scatter plot depicted by function scores can be presented in any suitable presentation format known in the art (e.g., graphical representation) to enable any individual person to identify his/her body shape group.

A new person's group membership can therefore be predicted by calculating her discriminant function score(s). To identify the degree of predictive accuracy of the DFs in classifying individuals to one of the body shape categories, original group memberships can be identified from cluster analysis and predicted group memberships can be classified from the DFs, and the two results can be compared. Depending on the results of this analysis, it can be determined whether classification by calculation of the DFs is accurate enough to predict body shape groups.

In Section 6.1, Example 1, results seen in Table 15 (FIG. 15) show that 97.5% of the women in the example were classified in the same body shape group by discriminant analysis. It was therefore considered that classification by calculation of the two DFs discussed in Section 6.1, Example 1 were accurate enough to predict body shape groups.

5.2 System and Method for Shape Prototyping for Design of Custom Fit Clothing

A method for shape prototyping for design of custom fit clothing is also provided. In one embodiment, the method can comprise the steps of:
(a) providing a full set of body measurements (widths, breadths, depths, arc measurements, circumferences, angles, and proportions of these measures) from a plurality of people, wherein the plurality is representative of a population of interest and wherein the full set of body measurements from the plurality is representative of a spectrum of body shapes and postures for which a garment is to be designed;
(b) computer-analyzing the full set of body measurements, wherein the analyzing step comprises the step of determining one or more prototype body shapes and wherein the prototype body shape quantifies the body measurements of a subset of the members of the plurality of people;
(c) providing a first adaptable guiding pattern, wherein the first adaptable guiding pattern comprises a structural form and a set of customizable distance and angle parameters; and
(d) producing a parameterized pattern, wherein the producing step comprises matching the values of the customizable distance and angle parameters of the adaptable guiding pattern to corresponding values derived from an individual person of interest (e.g., a customer) and wherein the parameterized pattern specifies a good-fit garment for the individual person of interest.

In one embodiment, the method can further comprise, between step (c) and step (d), the step of:
creating a set of modified adaptable guiding patterns from the first adaptable guiding pattern, wherein each modified guiding pattern in the set is matched to one of the one or more prototype body shapes identified in (b).

A system for shape prototyping for design of custom fit clothing is also provided. In one embodiment, the system can comprise:
(a) a full set (data set) of body-shape defining measurements (widths, breadths, depths, arc measurements, circumferences, angles, and proportions of these measures) from a plurality of people, wherein the plurality is representative of a population of interest and wherein the full set of body measurements from the plurality is representative of a spectrum of body shapes and postures for which garments are to be designed;
(b) a computer-based method for analyzing these measurements, wherein the method comprises the step of determining one or more prototype body shapes, wherein the prototype body shape quantifies the body measurements of a subset of the members of the plurality of people; and
(c) an adaptable guiding pattern for creating a parameterized pattern, wherein the adaptable guiding pattern comprises a structural form and a set of modifiable (customizable) distance and angle parameters, wherein the values of the modifiable (customizable) distance and angle parameters can be matched to detailed dimensions of an individual person of interest (e.g., a customer), thereby yielding a parameterized pattern customized for the individual person of interest, the parameterized pattern specifying a conventional pattern for a good-fit (or custom-fit) garment for the individual person of interest.

A computer-based method is also provided for identifying the appropriate body-shape prototype guiding pattern for an individual person's (e.g., customer's) set of measurements. In one embodiment, the method comprises the step of computer-analyzing a full set of body measurements wherein the step of computer-analyzing comprises the steps of:
conducting a principle component analysis (PCA) of all measurements in the set of body measurements;
obtaining principle component measurements from the PCA; and
performing an unsupervised clustering algorithm on the most significant principle components, thereby obtaining one or more prototype body shapes.

The full set of body measurements (widths, breadths, depths, arc measurements, circumferences, angles, and proportions of these measures) can be obtained from a plurality of people, wherein the plurality is representative of a population of interest and wherein the full set of body measurements from the plurality is representative of a spectrum of body shapes and postures for which garments are to be designed. An individual person's measurements may be taken by hand or by using computer analysis of a 3D body scan.

A computer-based method is also provided for producing a conventional pattern from which a custom-fit garment can be made for an individual person of interest (e.g., a customer). In one embodiment, the method can comprise the steps of:
producing a parameterized pattern comprising determining distance and angle parameters for an adaptable guiding pattern from a set of measurements from the individual person, and
producing a conventional pattern from the parameterized pattern. The values of the customizable distance and angle parameters can be matched to detailed dimensions of the individual person, thereby yielding the parameterized pattern. It will be apparent to the skilled artisan that the computer-based method can be refined empirically by exploring a range of size adjustments. Furthermore, the method can additionally comprise determining the good-fit outcome by observing the garment on one or more models. In a specific embodiment, one or more fit experts can be employed to determine or judge the good-fit outcome.

Pattern parameterizations may be achieved using conventional patternmaking standards known in the art to establish the differences between patterns created for the different shape groups (guided and augmented by the distance and angle parameters generated in the initial step of identifying body shape groups) or by the method disclosed herein for identifying the appropriate body-shape prototype guiding pattern for an individual person's (e.g., customer's) set of measurements.

5.3 System and Method for Computer-Assisted Design of Custom Fit Clothing

Systems and method for computer-assisted design of custom fit clothing are also provided. In one embodiment, the system can comprise the following components:
(a) An adaptable "guiding pattern" that comprises a structural form and a set of customizable distance parameters. The values of the parameters can be matched to the shape (detailed dimensions) of the customer so that the parameterized pattern will specify a good-fit garment for that individual.
(b) A machine learning system that can predict a set of distance parameters for a guiding pattern given a set of measurements taken from the customer; and (c) A computer algorithm that can combine the specific parameters for a customer with the structural form of a guiding pattern to produce a conventional pattern from which the custom-fit garment can be made.

For each guiding pattern, a documented database can be established comprising multiple tuples of distance parameter values, associated distance parameters, and good-fit outcomes. This database is used to train the machine learning system.

According to this embodiment, customer measurements may be taken by hand or by using computer analysis of a 3D body scan. Pattern parameterizations may be conducted using conventional commercial standards or by methods that are optimized for a machine learning method (see Section 5.4 below). The documented database may contain instances of both good and poor good-fit outcomes. The documented database can be created by experimenting with a range of predictions and involving a panel of experts to determine the good-fit outcomes by observing the garments on a set of models.

A shape prototyping system is also provided for designing a custom fit garment for an individual subject. In one embodiment, the system can comprise:

(a) a data set of body-shape defining measurements (e.g., widths, breadths, depths, arc measurements, circumferences, angles, and proportions of these measures) from a plurality of people representative of a population of interest to characterize the spectrum of body shapes and postures for which the custom fit garment is to be designed;

(b) a computer-based method for analysis of the measurements, wherein the computer-based method determines one or more prototype body shapes that identify or quantify a spectrum of shapes and postures that represent the population of interest;

(c) an adaptable guiding pattern for creating a parameterized pattern, wherein the adaptable guiding pattern comprises a structural form and a set of customizable distance and angle parameters, and wherein parameter values are matched to dimensions of the individual subject so that the parameterized pattern will specify a good-fit garment for the individual subject;

(d) computer-based method for creating a set of modified guiding patterns from the adaptable guiding pattern wherein each of the set of modified guiding patterns is matched to each of the prototype body shapes identified in (b);

(e) a method for identifying the appropriate body-shape prototype guiding pattern for the individual subject's set of body shape-defining measurements; and (f) a method for producing a parameterized pattern from a modified guiding pattern, comprising the step of establishing the modifying guiding pattern distance and angle parameters for the selected guiding pattern from the individual subject's set of body shape-defining measurements.

In one embodiment, the method of (f) can comprise a method for producing a conventional pattern from which the custom-fit garment can be made from the parameterized pattern.

In another embodiment, the computer-based method of (b) comprises conducting principle component (PC) analysis of the body shape-defining measurements to derive principle components (PCs) and conducting an unsupervised clustering algorithm on the PCs.

In another embodiment, the method of (f) is refined empirically by analyzing a range of size adjustments and/or using a panel of experts to determine good-fit outcomes by observing garment fit on a set of fit models.

5.4 Automated Pattern Customization Using Three-Dimensional (3D) Body Scans and Machine Learning Machine-learning systems and methods are also provided for generating good-fit patterns from a foundation pattern representation and a set of derived body measurements from a 3D body scan. In one embodiment, the machine-learning system can comprise a parametric model that encodes a template pattern to a customizable parametric representation and a learning system for predicting model parameters for a good fit for a set of body measurements.

An effective parametric representation can be developed for customization from a template pattern as described above. A good-fit database can be established for training and validating a good-fit prediction machine learning system as described above. The machine learning system is then trained and evaluated for its ability to predict good-fit model parameters.

As is well known in the art, a starting point for any machine learning method is a documented dataset containing multiple instances of system inputs and correct outcomes. This data set can be used, using methods known in the art, including but not limited to standardized machine learning methods such as parametric classification methods non-parametric methods, decision tree learning, neural networks, methods combining both inductive and analytic learning, and modeling approaches such as regression models, to train the machine learning system and to evaluate and optimize the performance of the trained system.

In one embodiment of the machine learning system, the inputs can comprise a set of a subject's body measurements. The outcome (output) will be a pattern specification that is known to be a good-fit corresponding to each subject's body measurements. The body measurements can be automatically determined from a 3D body scan, which is also included in the documented data set.

The template pattern sets the foundation for the customized pattern. Although the initial template may be specified in a number of different ways known in the art (for example, a basic pattern that is re-sized or graded on an XY coordinate measurement system with values derived from simple arc and/or circumferential body measurements of the individual). The initial template can be re-encoded into a parametric model wherein the parameters specify the customization to a subject's measurements.

There are standard parameterizations known in the art that are specified by garment manufacturers which reflect their design practices. These may be employed to provide an initial starting point from which new model parameterization may be produced with the machine learning system.

The machine learning system can be configured for predicting good-fit pattern parameters. Preferred configuration(s) for predicting good-fit pattern parameters can be developed through the testing of different input selections and internal models. Such techniques for machine learning are well known in the art. Different machine learning designs and configurations can then be compared and evaluated for predicting good-fit pattern parameters.

System Organization

A flow diagram depicting the organization of one embodiment of the machine-learning system is shown in FIG. 21. The initial pattern is encoded into a standardized parametric representation by a computer-based pattern analyzer.

In one embodiment, the pattern analyzer can identify the parameters of the 2D pattern, how it will be joined to create a 3D garment, and initial relationships between the garment and the body (i.e., a pants waist that corresponds with the body waist). The pattern analyzer can also generate the parametric representation of the pattern to be used by the pattern generator. A computer algorithm may realize the pattern analyzer function if the guiding pattern is provided in a standardized format or it may be accomplished manually if the guiding pattern is provided in a format for which the system has not been programmed to automatically accept.

In another embodiment, the pattern analyzer can perform a check in the process to ensure that the pattern is adjusted within parameters that will result in a useful pattern. The pattern analyzer will identify the parameters of the 2D pattern, how it will be joined to create a 3D garment, and initial relationships between the garment and the body (e.g., a pants waist that corresponds with the body waist).

This pattern representation, together with a set of good-fit parameters, can be input to a computer-based pattern generator, which generates the customized pattern. Data inputs can comprise data from a number of subjects with known good-fit patterns and can be used to train the database initially.

The pattern generator combines the predicted good-fit model parameters determined by the machine learning system for the specific person and combines these with a simple computer algorithm to the parametric representation of the pattern to provide a compete pattern in a standardized format from which the garment may be manufactured using conventional methods.

The customization model is produced by running the pattern analyzer, followed by inputting the pattern representation and the set of good-fit parameters, into the pattern generator. These processing components can be configured to realize standard existing customization models and to explore new models.

Using standard machine learning training end evaluation methods, a learned pattern parameter prediction system can be optimized to provide good-fit pattern parameters, given a set of subject's measurements. A number of suitable training methods known in the art can be employed; these methods can comprise the step of matching the systems predicted patterns to the good-fit patterns stored in the database. Once trained, the machine learning system can be used to create a customized pattern from a subject's measurements, as shown in FIG. 21.

The quality of the output of the machine learning system output depends on (a) the pattern parameterization, (b) the learning machine design and (c) the quality of the training database. These components can be refined and optimized using methods known in the art.

For example, the database can be refined by adding datasets for new documented subjects. The quality of the database can be improved, for example by populating the database with cases in which the customization was accomplished by one or more experts in garment customization. Thus the database will better represent the expert's knowledge. In a preferred embodiment, the database includes data for examples of poor fit designs, which can assist in the evaluation of a trained system.

In one exemplary embodiment, the learned pattern predication system can be a nearest neighbor based learning system. The Fit model database in that case would consist of tuples containing sets of body measurement parameters for an individual together with associated good-fit model parameters and a measure of the quality of fit of those parameters. The value for the quality of fit can be determined by expert opinion of the fit of a manufactured garment. This database can be created (trained) by monitoring the process of conventional manual custom fitting. That is, as a garment is custom designed, the parameters of the first fitting can be entered with a low fit quality rating and subsequent improved fittings can also be entered into the database with higher quality ratings.

Once the database is created a new person's parameters is matched to all customer measurements in the database and the best fit parameters associated with the closest matching database entry having the highest quality factor would determine the predicted good fit model parameters. Extensions to such a learning system would avoid database values that have provided low quality fits. Incremental learning can be facilitated by adding additional database entries for cases when the system provides a poor outcome that is subsequently updated by a manual custom fit. Machine learning methods beyond nearest neighbor methods would typically be preferentially used if they can be shown to provide a superior performance for this task.

The machine learning system can be used for developing and evaluating automated customization systems. It can be used for characterizing different design models and for accommodating different initial patterns. 3D body scans can be used to input new body measurements that may aid in the quality of the fit of the customized pattern. One benefit of this system is that once a sufficient number of good-fit models and associated patterns have been acquired in the subject database, no additional garment fabrication is necessary for the system to be optimized and validated.

Computing Device(s) for Use in Connection with System and Method

System and method for computer-assisted design of custom fit clothing are disclosed herein. One or more of the steps and functions disclosed and contemplated herein can be implemented on systems constituted by a plurality of devices (e.g., host computer, interface, reader, and printer) or to a single device. By way of example, and with reference to the functional schematic drawing of FIG. 22, there is provided one example of a computing device 900 for use in connection with the systems and methods of the present disclosure. In FIG. 22, reference block 900 designates personal computing equipment such as an IBM personal computer (PC) or PC-compatible computer, laptop, PDA, smartphone or other device compatible with the concepts disclosed herein. Computing equipment 900 includes a CPU 902 such as a processor, microprocessor or related device that executes stored program instructions such as operator-selected applications programs that are stored in ROM 904 or specialized functions such as start-up programs which are stored in RAM 906. Computing equipment 900 further includes a local area network interface device 908, which provides access to a local area network 910 whereby the computing equipment can access files on a remote file server or send files for remote printing or otherwise interact with a local area network in accordance with known techniques such as by sending or receiving electronic mail.

Computing equipment 900 can further include a monitor 912 for displaying graphic images and a keyboard/mouse 914 for allowing operator designation and inputting functions. Neither of the monitor 912 or the keyboard/mouse 914 are however necessary for implementations of the steps and functions. Moreover, other examples of computing equipment 900 can include other mechanisms for interfacing with the equipment 900, wherein such mechanisms can include touchscreens, touchpads, and the like.

Mass storage memory 916 is connected for access by CPU 902. Mass storage memory 916 typically includes stored program instruction sequences such as an instruction sequence for performing one or more of the steps outlined above, or other application programs such as word processing application programs, optical character recognition programs, spread sheet application programs, and other information and data processing programs. Mass storage memory 916 can also store repositories including data, information and reference tables for use in connection with concepts of present disclosure, and other data as designated by the operator.

A modem 918 such as a wireless interface device, as well as other peripheral devices 920 such as, but not limited to, a facsimile interface and a voice telephone interface can be provided so that CPU 902 can be part of a system 1000 and can interface with external devices including local server 2000 and external server 3000 via network 2500. Thus, CPU 902 can send and receive data including sending via means other than means 910.

The configuration of the system 1000 can be utilized to process, execute, or implement (collectively, "process") any one or more of the steps and functions above. In one configuration one or more of the local server 2000 and the remote server 3000 is utilized to entirely process the steps in a manner consistent with this disclosure. In one embodiment, executable instructions related to one or more of the steps can be located outside of the computing device so as to permit data and information to be transferred from the computing device to, e.g., the local server 2000 and/or remote server 3000, for immediate and/or further processing. In another embodiment, processing steps and methodologies disclosed, described, and contemplated herein can be distributed throughout the system 1000 such as between and amongst the computing device, the local server 2000, the remote server 3000, as well as the rest of the system, grid network, and/or cloud computing network, with still other embodiments being configured for the processing steps to be executed entirely by the computing device. Having the processing steps executed exclusively on the computing device can significantly reduce bandwidth required by transferring text rather than audio files. Moreover, this processing can reduce delay from the moment the user chooses an audio version of a Web site until the audio version is ready to use in the user's (mobile or stationary) computing device.

In view of the foregoing, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may in whole or in part be generally be referred to herein as a "circuit," "module" or "system," and "platform." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Objective C, C++ or the like and conventional procedural programming languages, such as the "C" programming language or similar programming languages. The programming language can also be compiled or interpreted as recognized in the art. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer code may likewise be executed on a physical or virtual machine.

There is provided above some aspects of the present disclosure that are described with reference to flowchart illustrations and/or block diagrams of methods, apparatus (systems) and computer program products according to embodiments made in accordance with the concepts and implementations contemplated herein. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figure(s). For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In still other embodiments, the system 1000 is or may be part of a cloud or adapted as a cloud computing network with a network of interconnected nodes (e.g., computers, servers, and the like). Cloud computing is a model of service delivery for enabling convenient on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can be characterized in a variety of ways. For example, exemplary cloud computing networks may have:

On-demand self-service: a cloud consumer can unilaterally provision computing capabilities, such as server time and network storage, as needed automatically without requiring human interaction with the service's provider;

Broad network access: capabilities are available over a network and accessed through standard mechanism that promote use by heterogeneous thin or thick client platforms (e.g., mobile phones, laptops, and PDAs);

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter);

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time; and Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

One or more of the steps highlighted above, and contemplated herein, can likewise be executed by utilizing a processor such as the processor 902 (FIG. 22) above or other computing device, network, etc.

The following examples are offered by way of illustration and not by way of limitation.

6. EXAMPLES

6.1 Example 1

Lower Body Shape Analysis

This example demonstrates a method for lower body shape categorization. In this example, principal component (PC) analysis was selected to extract distinctive shapes from silhouette and profile views of the body. The example also demonstrates that an improved system for automatic customization of patterns can be created if the process is started from base patterns that are balanced and corrected for each customer's figure type.

To address problems found in previous PC studies, we employed two strategies. The first strategy was to focus on classifying only the lower body shapes rather than the whole body shapes. Lower body shape analysis was selected for the study disclosed in this example because: (a) customers are the least satisfied with the fit of pants compared to all other apparel items (Charoensiriwath, S., and Spichaikul, P., Constructing Thailand's National Anthropometrics Database Using 3d Body Scanning Technology, in "Proceedings of Pacific Neighborhood Consortium Conference", Taipei, Taiwan, 2009 [accessed April 2010], http://www.pnclink.org/pnc2009/chinese/Abstract/08-Unfoldinge-Culture/08_UnfoldingeCulture_Abstract_PiyawutSrichaikul.pdf; DOB-Verband, Women's outer garment size chart (1983)) and (b) many of the made-to-measure apparel companies currently provide pants as a custom garment style ([TC]$^2$, Custom Clothing, 2009 [accessed April 2010], http://www.tc2.com/news/3 dbody.html). The second strategy was to include various types of shape defining measurements such as width, front/back depth, arc measurements and the drop values between measurements of primary body locations instead of simple circumference and length measurements.

Data for this analysis was derived from the SizeUSA database ([TC]$^2$, 5651 Dillard Dr., Cary, N.C. 27518 USA), a large representative database of measurements of U.S. women. The Size USA sample was sorted to contain only those women who would fit in the ASTM Missy size range. This was done by retaining only women with BMI between 16.2 and 34.1 ($90^{th}$ percentile BMI). This was done for two reasons; to eliminate body shapes that belong in a plus size category, and to retain all waist and hip sizes in the Missy category. The original SizeUSA data did not have width and depth measurements except for the depth between abdomen prominence point to buttocks point. However, 3D scans have an advantage, that new measurements can be re-generated at a later date, if 3D scans are kept.

Cluster analysis was conducted using the principal component scores as independent variables to identify different body shapes. Creating body shape categories is only the first step. Previous studies which used these methodologies (PCA and cluster analysis) did not progress past this stage. However, to create a system that can be effectively used for further research, we also developed a simple and intuitive application method for defining a new person's body shape group. A discriminant analysis was conducted and discriminant functions consisting of the appropriate body measurements were developed. This system provides simple formulas for classification of an individual in a body shape group, making it possible to compare their calculated function scores with the range of function scores of each body shape group.

A reliable and objective categorization method was developed for lower body shapes of women aged 18 to 35, who are within the $90^{th}$ percentile (16.2 to 34.1) of body mass index (BMI) scores (excluding more obese women), using principal component analysis and cluster analysis. Discriminant functions were created that classify lower body shapes identified in objective 1, as a tool for classification of individuals to body shape groups.

The rate of predictive accuracy of the discriminant functions was determined in classifying body shapes by comparing the original group membership identified from cluster analysis with predicted group membership obtained from discriminant functions.

Methodology

Measurement Selection

The dataset used for the study disclosed in this example was measurements of women aged 18 to 35 from the SizeUSA dataset (McConville, J. T., "Anthropometry in Sizing and Design", Chapter VIII in Anthropometric Source Book, Nasa Reference Publication 1024, Volume 1: Anthropometry for Designers, National Aeronautics and Space Administration, Washington, D.C., USA (1978)).

Measurements that are related to lower body shape analysis were selected on the basis of two considerations: (a) front/back arcs, widths, and front/back depths should be included for more specific categorization of both silhouette and profile of the lower body, unlike previous body shape analysis methods based on ratios or drops of girth measurements only, (b) measurements should be useful for application to pants pattern making. Width and depth measurements are difficult to apply to a traditional pattern making method, but they provide direct measures defining the silhouette and profile of the body. Therefore, we utilized all of these measures; girths, front/back arcs, widths, and depths for this study. Length measurements (waist to hip height, waist to abdomen height, and waist to crotch height) and length proportions (waist to hip height/waist to crotch height, and waist to abdomen height/waist to crotch height) were also considered in the initial calculations.

There was only one depth measurement, the distance between the abdomen prominence point and buttocks prominence point in the SizeUSA data, which was calculated by subtracting 'Buttocks Back X' from 'Abdomen Front X' (FIG. 1). However, this measurement by itself could not represent the degree of abdomen prominence and buttocks prominence in relation to other body areas such as waist.

'Front X', and 'Back X' at the waist and hip level were generated from the original SizeUSA scans by the Textile Clothing Technology Corporation ([TC]$^2$). The side seam location was determined by a plane centered at the mid-point between the abdomen prominence point and buttocks prominence point. Front depth, back depth, and full depth were calculated at the waist level and hip level. Waist widths and hip widths were additionally provided by [TC]$^2$. Girth, front arc, and back arc at the waist level, top-hip level and hip level; girth at the max-thigh level; and buttocks angle measurement were selected from the original SizeUSA data (a total of 18 raw measurements). Other measurements including length measurements were initially considered for inclusion in the analysis. Length measurements were not used in the final analysis. The discussion of testing and discarding length measurements can be found in 'Consideration of length variables' of Results section.

Table 1 (FIG. 7) presents the measurement procedures and landmarks used to derive SizeUSA data from body scans for the measurements used in the final analysis. A total of 14 drops and 1 angle were calculated: Drop values of girths (hip to waist, top hip to waist, and hip to top hip {1-3}), drop values of back arcs (hip to waist, top hip to waist, and hip to top hip {4-6}), drop values of front arcs (hip to waist, top hip to waist, and hip to top hip {7-9}), drop values of widths (hip to waist {10}), drop values of depths (hip to waist {11}), drop value of back depths (hip to waist {12}), and drop values of front depths (abdomen to waist, and abdomen to hip {13-14}), and buttocks angle {15} (see {numbers} listed in FIG. 2). The side seam location for the arc measurements were different from that of the front/back depth measurements. Arc measurements were defined automatically and constrained to the definition used in SizeUSA. Even if we had an 'optimal' single definition of side seam placement, it would not affect our results as differences are small among the different methods.

Since this study focused on body shape analysis regardless of body size, the strength of the relationship between weight (a representative measurement related to body size) and 33 variables (18 raw measurements and 15 drops) was examined by running bivariate correlation analysis using the statistical package SPSS 17.0. If there was a weak linear relationship between weight and a measurement, it was considered a shape-related variable. Out of 18 raw measurements, the buttocks angle had only a low correlation value ($r=0.088$, $p<0.01$). Most drops also had low correlation values ($r=-0.281$ to $0.345$, $p<0.05$), with the exception of the hip girth to max-thigh girth drop ($r=0.696$, $p<0.01$). Bivariate correlation analysis found that there were weak linear relationships between weight and 15 variables (buttocks angle and 14 drops). Linear relationships such as a curvature relationships not revealed in single correlation calculation could also possibly exist. Therefore, we conducted a regression analysis with weight as a dependent variable, and a variable and its square as independent variables. If r value was significantly high ($p<0.05$), the function [weight=$a+b\times$(variable)+$c\times$(variable)$^2$] could be judged to be meaningful; expressed as curvature relationships. R values did have significance, but when r value in the linear model was compared with that in the model which a quadratic term was added, the explanatory power was not improved; r values were only increased by about 0.02 to 0.10. Therefore, we could conclude that the 15 variables had both weak linear and curvature relationships to weight. They could be considered as shape-related variables, so they were included in the following analysis. Table 2 (FIG. 8) presents the descriptive statistics of the variables.

Sample Selection

There were 2,981 women aged 18 to 35 in the SizeUSA data. Percentiles of BMI (Body Mass Index), waist girth measurement, and hip girth measurement were calculated (Table 3, FIG. 8). The Size USA sample was sorted to contain only those women who would fit in the ASTM Missy size range. Waist girth measurements and hip girth measurements of size 2 (the minimum size) and size 20 (the maximum size) of the sizing standard ASTM 5585-95 (Standard of body measurements for adult female misses figure type sizes 2-20) were also compared with the girth measurements of SizeUSA data. Both the waist girth (59.7 cm) and hip girth (86.4 cm) of size 2 were positioned below the $5^{th}$ percentile of SizeUSA data. Both the waist girth (95.2 cm) and hip girth measurements (121.9 cm) of size 20 were positioned between the 75th and 90th percentile of SizeUSA data. The percentile of BMI was compared with BMI categories provided by National Heart Lung and Blood Institute (National Heart Lung and Blood Institute, BMI Categories, 2009 [accessed August, 2009], http://www.nhlbisupport.com/bmi/bmicalc.htm). Body Mass Index (BMI) is a number calculated from a person's weight and height. BMI provides a reliable indicator of body fat and is used to screen for weight categories. BMI Categories: Underweight=<18.5, Normal weight=18.5-24.9, Overweight=25-29.9, Obesity=BMI value of 30 or greater (http://www.nhlbi.nih.gov/guidelines/obesity/index.htm).

The BMI value of 30 (classified as the 'obese' category) was positioned between the 75th and 90th percentile of the SizeUSA data. In consideration of the distributions of all three values (BMI, waist girth, and hip girth), women (n=2,682) within the range of the 16.2 (minimum) to 34.1 (the 90th percentile of BMI) only were selected. This was done for two reasons; to eliminate body shapes that belong in a plus size category, and to retain all waist and hip sizes in the Missy category. In addition, outliers (n=194), whose measurements exceeded three times the standard deviation from the mean of the measurement were removed. As the number of outliers was less than 10% of the total sample, the final dataset (n=2,488) was considered appropriate for the statistical analysis.

Body Classification Method

Statistical methods for body classification consisted of principal component analysis and cluster analysis. Principal component analysis is a mathematical procedure that transforms a number of possibly correlated variables into a smaller number of uncorrelated variables called principal components. Two major rotation systems for extracting principal components are available: Orthogonal and Oblique. The assumption of Orthogonal system is that each measurement is correlated to each component, but components are not correlated each other. On the other hand, the assumption of Oblique system is that each measurement is not correlated to each component, but components are correlated each other. For this study, Varimax rotation method, a representative method of Orthogonal coordinate system, was selected since it could provide independence among principal components. The decision on the number of components to be retained was made with consideration of three aspects: (a) eigenvalues that correspond to the sum of the squared loadings for a principal component, (b) rotated component loadings, and (c) the number of variables that have high correlations with each component (National Heart Lung and Blood Institute, BMI Categories, 2009 [accessed August, 2009], http://www.nhlbisupport.com/bmi/bmicalc.htm).

With respect to eigenvalues, principal components should have eigenvalues greater than 1.0 (Kaiser-Guttman's standard) (Warner, R. M., Applied Statistics: From Bivariate through Multivariate Techniques, Sage Publications, Los Angeles, USA (2008)) and they should also be large enough to be distinguished from the rest of the principal components. The next consideration was that each measurement should have high component loadings (correlation) with one principal component. If a measurement was highly correlated with more than two components, the analysis re-conducted with this measurement removed. Regarding the third criteria, each principal component should have a minimum of three variables in practice. If a component had less than three variables, the component could not be retained since it did not have enough indicator variables. However, for variables that were important for patternmaking and that represented a distinctive lower body shape, the z-score of the measurement was calculated and used for cluster analysis as an independent variable. A z-score indicates how many standard deviations an element is from the mean. A z-score can be calculated from the following formula $[z=(X-\mu)/\sigma]$ where z is the z-score, X is the value of the element, $\mu$ is the population mean, and $\sigma$ is the standard deviation (Korean Standard Association, KS K 0051:2009 Sizing systems for female adult's garments (2009)). z-score 1 was 'drop of front abdomen depth to waist front depth' and z-score 2 was 'drop of front abdomen depth to front hip depth'.

Using each principal component that clearly represented a distinctive shape from silhouette and profile views of the lower body, K-means cluster analysis was conducted using the principal component scores as independent variables to categorize body shapes. After we assessed several options, classifying the data into two to five clusters, the final number of the clusters was decided with the consideration of a similar number of people in each cluster, significant differences among clusters, and a reasonable number of clusters for further study. To analyze whether clusters were significantly different from one another, each body measurement was compared through Duncan's multiple range test of ANOVA post-hoc analysis.

Prediction Method

Discriminant analysis was used to classify body shapes identified from the cluster analysis. The dataset included body shape group memberships coded by the cluster analysis as a 'grouping variable', and the measurements corresponding to principal components identified as 'independent variables'. The discriminant analysis was performed by stepwise-method, and key measurements were extracted that discriminate among groups. Once the discriminant functions were calculated, their significance and their percentage of the variances were examined. To identify the rate of predictive accuracy of the discriminant functions in classifying body shapes, the original group membership identified from the cluster analysis and the predicted group membership from discriminant functions were compared. Means of function scores and a scatter plot depicted by function scores were presented to enable anyone to identify her body shape group.

Results

Pre-Principal Component Analysis

Principal component analysis (PCA) was conducted using fourteen drops and a buttocks angle. The total amount of variations in the sample was 15. Five principal components (PCs) with eigenvalues greater than 1.0 were extracted (Pre-PCA1). Table 4 (FIG. 9) shows that 87.7% of the variation of the fifteen variables was explained by 5 PCs. As presented in Table 5 (FIG. 9), the first PC had high loadings with seven drops: top hip girth to waist girth, front top hip arc to front waist arc, back top hip arc to back waist arc, hip width to waist width, hip girth to waist girth, front hip arc to front waist arc, and back hip arc to back waist arc. The second PC had a high correlation with five drops: hip girth to top hip girth, front hip arc to front top hip arc, back hip arc to back top hip arc, hip to waist girth, and front hip to waist arc. The third PC had a high correlation with the buttocks angle and two drops: back hip depth to back waist depth, and hip depth to waist back depth. The last two PCs have only a single variable: PC4—drop of front abdomen depth to front waist depth, and PC5—drop of front abdomen depth to front hip depth.

Each variable should have high component loadings with a single PC, but four of the drops (hip girth to waist girth, front hip arc to front waist arc, back hip arc to back waist arc, and back top hip arc to back waist arc) were highly correlated with two PCs (Table 5, FIG. 9). As presented in Table 6 (FIG. 10), after the removal of three drops (hip girth to waist girth, back hip arc to back waist arc, and back top hip arc to back waist arc) from the PCA, the five PCs with eigenvalues of 1.0 and more (with 12 total variations in the sample) had variables with high loadings for only their PC (Pre-PCA2). Interpretation of the PCs was based on variables with high component loadings.

Even though 5 PCs were extracted since their eigenvalues were greater than 1.0, only the first three PCs (PC1, PC2, and PC3) were found to make a strong contribution to variance explained: PC1=25.5%, PC2=23.3%, PC3=19.6%. The contribution of the next two PC values was much less: PC4=10.5% and PC5=10.3%. In addition, each PC should have minimum of three variables, but the last two PCs had a single variable, which was not enough to provide adequate information about that component.

Therefore, the first three PCs were only considered as true PCs, and the last two PCs were removed from the final PCA. However, since the variables from PC4 and PC5 were also critical components that represent distinctive shapes from silhouette and profile views of the lower body, these variables were calculated as z-scores, and their z-scores were used in the cluster analysis as independent variables (z-score 1: 'drop of front abdomen depth to waist front depth', and z-score 2: 'drop of front abdomen depth to front hip depth').

Consideration of Length Variables

We also tested length measurements for inclusion in the PCA, including 'waist to hip height', 'waist to abdomen height' and 'waist to crotch height'. All three length measurements were collected under one PC, since they were highly correlated with each other. Therefore, we concluded that these measurements would not be useful for sorting into body shape groups. This is the same reason that we excluded body size-related measurements such as general girths, front arcs, back arcs and inseam length.

We then tried a PCA that included length proportions: 'waist to hip height/waist to crotch height', and 'waist to abdomen height/waist to crotch height'. The results showed that the first two variables were included in the 'waist to hip silhouette' PC with relatively low loadings (0.620, 0.562). Since no specific PC related to a specific vertical descriptor was found, we used only horizontal measurements in the final PCA.

Final Principal Component Analysis

Once all of the final variables were chosen, an additional PCA was performed with the two variables corresponding to PC4 and PC5 removed. Analysis of the remaining variables yielded 82.1% of the variations explained by three PCs with eigenvalues 1.0 and greater (with 10 total variations in the sample): PC1=30.7%, PC2=27.8% and PC3=23.6%. The three PCs were considered as appropriate for the cluster analysis since each PC had three or four variables which had high loadings for only their PC, as shown in Table 7 (FIG. 10). PC1 can be interpreted as 'waist to top hip silhouette', PC2 as 'top hip to hip silhouette', and PC3 as 'buttocks prominence'. As shown in FIG. 3, each PC can clearly represent a distinctive shape from either the silhouette or profile view of the body. These PC scores were saved in the dataset, and used for the cluster analysis.

Cluster Analysis

K-means cluster analysis was performed using PC1 score, PC2 score, PC3 score, and z-scores 1 and 2 as independent variables to categorize lower body shapes. We experimented with different numbers of clusters, dividing the 2,488 women into two, three, four and five clusters, and analyzed each set of clusters. We concluded that three clusters were the most efficient and appropriate to represent complex lower body shapes for this study. The reasons are as follows:

When 2, 3, or 4 clusters were categorized, the data were judged to be relatively evenly divided into each cluster as follows; in 2-cluster model (cluster 1: n=1,186, 47.7%, cluster 2: n=1,302, 52.3%), in the 3-cluster model (cluster 1: n=727, 29.2%, cluster 2: n=867, 34.9%, cluster 3: n=894, 35.9%), and in the 4-cluster model (cluster 1: 639, 25.7%, cluster 2: 575, 23.1%, cluster 3: 721, 29.0%, cluster 4: 553, 22.2%), However, in the 5-cluster model, cluster 3 only represented 10% of the total data (cluster 1: 461, 18.5%, cluster 2: 646, 26.0%, cluster 3: 251, 10.1%, cluster 4: 531, 21.3%, cluster 5: 599, 24.1%). Therefore we concluded that 5-cluster model was not appropriate for lower body shape analysis for this stage of our study.

In the 2-cluster model, cluster 1 had a straight front silhouette, flat abdomen, and prominent buttocks, and cluster 2 had a curvy front silhouette, prominent abdomen and flat buttocks. The 'Straight' shape in both front and side views, which existed in the 3-cluster model, did not exist in the 2-cluster model. We concluded that two clusters were not enough to represent complex lower body shapes, and the 3-cluster model was more appropriate to represent lower body shapes than the 2-cluster model.

The 4-cluster model was also considered as a possible choice for this study. However, in this model though cluster 1 and cluster 2 had obvious shape differences when compared to the other two clusters, cluster 3 and 4 had shapes similar to each other. Since this research was considered as an early stage of these kinds of shape analysis studies using PCA and cluster analysis, the 4-cluster model did not have much merit when compared to the 3-cluster model. Therefore, we chose three clusters as the final number.

In the 3-cluster model, a one-way ANOVA was conducted based on 95% confidence level to compare the mean scores on the five variables used in the cluster analysis. Table 8 (FIG. 11) shows that the overall F for the one-way ANOVA was statistically different ($p<0.05$). As a post-hoc analysis, Duncan's multiple range test showed that the means of all possible pairwise comparisons on the five variables were significantly different at the 0.05 level, except for the z-score of 'drop of front abdomen depth to waist front depth' (z-score 1) between group 2 and group 3. This means that each group is in a subset by itself in four variables, but regarding the fifth variable, the z-score 1, two subsets were identified as group 1 and group 2/3.

Table 8 (FIG. 11) also presents the means and standard deviations of the PCs and z-scores of each body shape group on five variables, ranked by a, b, and c, and ordered by the magnitude of the mean value. Considering the waist to top hip silhouette (PC1), group 1 is the curviest (0.967), while group 2 (−0.356) and 3 (−0.440) have rather straight silhouettes. With respect to top hip to hip silhouette (PC2), group 1 has a somewhat straight silhouette (0.008), group 2 is the straightest (−0.367), and group 3 has the curviest shape (0.349). Regarding buttocks prominence (PC3), group 1 has somewhat flat buttocks (−0.151), group 2 has the most prominent buttocks (0.730) with a large difference from the other two groups, and group 3 has the flattest buttocks (−0.585). For the abdomen prominence (z-score 1), group 1 has the most prominent abdomen (0.894) with a large difference from the other two groups, group 2 (−0.403) and 3 (−0.337). Regarding the slope of the abdomen prominence point to the front point at hip level (z-score 2), group 1 has a somewhat vertical profile (−0.023), group 2 is the most sloped and tilted toward the back (0.720), and group 3 has the most vertical profile (−0.679).

Table 9 (FIGS. 12A-B) presents means and standard deviations of each body shape group on 12 variables. The overall F for the one-way ANOVA was statistically different on all variables, and the means of most variables demonstrated the same relationships as the means of their PCS. FIG. 4 shows how the means of each principal component and z-scores compare among the three body shape groups.

To sum up characteristics of each body shape, group 1 (curvy shape) has the curviest silhouette between waist level and top hip level, and the most prominent abdomen among the three groups. The most notable characteristic of group 2 (hip tilt shape) is that this group has the most prominent buttocks, and their lower body is tilted toward the back. Group 2 also has a rather straight silhouette between the waist level and top hip level similar to group 3. However, group 2 has a fuller top hip than group 3. Group 3 (straight shape) has a non-curvy silhouette and non-prominent buttocks.

From the SizeUSA database of scans, we tried to identify fit models for each of the three body shape groups, who have median sizes of all five variables. However, it was impossible to find perfect fit models, a normal outcome given the fallacy of the average man (McConville, J. T., "Anthropometry in Sizing and Design", Chapter VIII in Anthropometric Source Book, Nasa Reference Publication 1024, Volume 1: Anthropometry for Designers, National Aeronautics and Space Administration, Washington, D.C., USA (1978)). Therefore, we identified some individuals that generally represent each body shape group, and their 3D scans were provided from [TC]$^2$. To generate fit model examples (FIG. 5), we selected 3D scan files (.obj format) which could represent each body shape. Then using the 3D tools in Photoshop CS4, we manipulated and refined the 3D images to represent each silhouette in the three directions (front/side/back) most effectively. These silhouettes were adjusted to match the calculated average key measurements for each group. Front silhouettes and profile sketches of each lower body shape group are also shown in FIG. 5 for comparison.

The population distribution of each of the three body shape groups was analyzed according to two age groups (Table 10, FIG. 13). In women aged 18 to 25, group 3 (straight shape) is the largest group (43.8%), group 2 (hip tilt shape) follows with 35.9%, and group 1 (curvy shape) is least represented with 20.3%. On the other hand, in women aged 25 to 35, group 1 (curvy shape) was the largest group (39.9%), group 2 (hip tilt shape) follows with 22.6% and group 3 (straight shape) with 26.5%. It is speculated that this is due to an increase in abdomen prominence as the age increases.

Table 11 (FIG. 13) shows that there is also a difference in lower body shapes according to ethnicity. Caucasians were classified into the three body shape groups more evenly than the other ethnicities. The Hispanic population was classified primarily as either group 2 (hip tilt shape) (42.4%) or group 3 (straight shape) (40.3%); only 17.3% were identified as group 1 (curvy shape). Almost half of African American women were classified into group 2 (hip tilt shape) (50.2%), and only 19.5% into group 1 (curvy shape). Others including Asians were classified fairly evenly into body shape group 1 (38.4%), group 2 (hip tilt shape) (33.4%), and group 3 (straight shape) (28.2%). The results showed that African American and Hispanic people tend to have more prominent buttocks and a less prominent abdomen than Caucasians and Asians.

Discriminant Analysis

The discriminant analysis was performed with three body shape group memberships coded by the cluster analysis as a grouping variable, and twelve variables used for the PCA and the cluster analysis to develop a means to classify individuals in the study shape groups. The discriminant analysis extracted nine out of twelve variables as key measurements, which discriminate three groups identified from the cluster analysis. Three variables not represented included both the front arc and back arc hip to top hip and back depth hip to waist.

Two discriminant functions (DFs) were found. The first row in Table 12 (Wilks' Lambda, FIG. 14), '1 through 2' provides information about the statistical significance of the entire model using DF 1 and DF 2 combined. Since a chi-square statistic is $\chi^2$ (18)=4094.96, p<0.001, the overall model, including both DF 1 and DF 2, significantly predicted group membership. The second row of the table shows the significance of DF 2 alone. Since a chi-square statistic is $\chi^2$ (8)=1904.46, p<0.001, thus, the overall model with the only DF 2 significantly predicted group membership. In Table 13 (FIG. 14), additional information about the relative predictive usefulness of DF 1 and DF 2 is presented. Here it can be seen that 55.1% of the variance was predicted by DF 1, and 44.9% of the variance was predicted by DF 2. Thus, it is clear that the entire model should combine both DF 1 and DF 2 to explain 100% of the variance. Table 14 (FIG. 14) reports the coefficients that were used to construct DFs, and shows the correlation of each variable with each DF. The two DFs are as follows:

$$DF1=(a\times-0.143)+(b\times-0.011)+(c\times-0.386)+(d\times-0.197)+(e\times-0.165)+(f\times0.089)+(g\times0.858)+(h\times-2.324)+(i\times2.158)+(-2.493)$$

$$DF2=(a\times0.357)+(b\times-0.327)+(c\times0.023)+(d\times0.191)+(e\times-0.258)+(f\times0.017)+(g\times0.544)+(h\times1.522)+(i\times1.420)+(-5.740)$$

A new person's group membership can be predicted by calculating her DF1 score and DF2 score, and comparing these scores with the scatterplot in FIG. 6. Group 1 tends to have a positive DF1 score and a positive DF2 score. Group 2 has a negative DF1 score, but the DF2 score can be either positive or negative. Group 3 can have either a positive or negative DF1 score, but a negative DF2 score.

To identify the degree of predictive accuracy of the DFs in classifying women to one of the three body shapes, the original group memberships were identified from cluster analysis and predicted group memberships were classified from the DFs, and the two results were compared. Results can be seen in Table 15 (FIG. 15); 97.5% of the women were classified in the same body shape group by the two methods. It is considered that classification by calculation of the two DFs is accurate enough to predict body shape groups.

Conclusions and Discussion

With 3D body scan technology, new types of measurements such as width, front depth, back depth, front and back arc measurements, and their drops could be derived for our analysis. In our PCA we could prevent all horizontal measurements and vertical measurements from collecting into either PC1 or PC2 and obscuring the differences in body shapes, which was a problem demonstrated by the past studies (Green, M. E., An application of U.S. Army Women's Anthropometric Data to the Derivation of Hypothetical Sizing/tarrifing Systems, Clothing Res. J. 9, 16-32 (1981); Salusso-Deonier, C. J., Delong, M. R., Martin, F. B., and Kohn, K. R., A Multivariate Method of Classifying Body Form Variation for Sizing Women's Apparel, Clothing Textiles Res. J. 4(1), 38-45 (1985); Salusso, C. J., Borkowski, J. J., Reich, N., and Goldsberry, E., An Alternative Approach to Sizing Apparel for Women 55 and Older, Clothing Textiles Res. J. 24(2), 96-111 (2006). using PCA and cluster analysis. The three principal components and z-scores of two variables (corresponding PC4 and PC5 identified from the pre-PCA) clearly represented distinctive shapes from silhouette and profile views of the lower body. A representative system identifying three lower body shape groups was developed, and the three groups from the cluster analysis were shown to be significantly different from one another on all components.

In some embodiment, more than three clusters may be preferred to fully represent complex body shapes. It is difficult to categorize the specific number of clusters since the data are continuous, resulting in difficulty in dividing groups into distinct clusters, an issue with any shape analysis system. However, three clusters were the most efficient cluster number for our study when compared to two, four, or five clusters. Here we present a method for body shape analysis. These methods can be used to develop other body shape groups using different body measurements or different numbers of clusters. For example, we rejected the 5 cluster model because cluster number 3 in this model represented a very small percentage of the population.

Our body shape analysis method has different and improved features that are more effective when compared to prior known methods. While the method described by Connell et. al (Connell, L. J., Ulrich, P. V., Brannon, E. L., Alexander, M., and Presley, A. B., Body Shape Assessment Scale Instrument Development for Analyzing Female Figures, Clothing Textiles Res. J. 24(2), 80-95 (2006)) described body shape in all dimensions, it relies on a visual analysis method using nine scales for body shape assessment from front and side views. The method we have developed is a more objective and reliable method using calculation from a measurement database. Other popular categorization methods such as that developed by Simmons, Istook, and Devarajan (Simmons, K. P., Istook, C. L., and Devarajan, P., Female Figure Identification Technique (FFIT) for Apparel, Part II: Development of Shape Sorting Software, J. Fashion Mark. Manage. 4(1), 1-15 (2004)) based on ratios of body circumferences have value. However, these can represent only general proportions and is unable to differentiate shapes in all dimensions (front and side views) completely. The method disclosed herein uses a variety of measurements and more complex calculations that can describe front and side silhouettes more completely at each body locations.

Previous studies that used PCA and cluster analysis did not progress past the initial stage of identifying different groups. However, to use these results, it is preferable to be able to easily identify the body shape group of new study participants who are not in the database used for analysis. Therefore, we went one stage further to develop an application for determining a new person's body shape group; a discriminant analysis.

Other methods can be used to define the body shape. For example, it is possible to define cluster models which could be used to score new subject's measurements as having the highest likelihood of belonging to an individual cluster. Specifically, from new measurements, their corresponding PC scores derived through transposing the measurements with the eigenvectors calculated from our training sample can be defined, and then these scores can be classified as belonging to one of the PC clusters where a PC cluster would have a mean PC score with a known variability. The mean and variation would allow the new person to calculate a probability score from the new PC scores for each cluster. The highest probability would define the cluster the new subject belonged to. However, we believe that one advantage of the discriminant analysis method disclosed herein is that it is more direct and intuitive. Since our functions consist of two simple equations, the scores can be calculated simply without access to the data used to identify PC clusters. Identifying an individual's place in the cluster is easier because it is a simple process to compare the two scores with the bivariate scatterplot. Our method can also show if a person is centered in the cluster, or is close to a border between clusters.

The study described in this example was the first stage of a project whose goal was to develop an improved automated custom patternmaking system. Section 6.2, Example 2, below, demonstrates the development of a block pants pattern for each body shape group identified from this study and the testing of a shape-driven customization system whose alterations start from the appropriate block patterns.

The system can be tested to determine whether it produces custom pants with better fit. In the existing automated made-to-measure computer-aided design programs, girths (e.g., waist girth and hip girth) and lengths (e.g., inseam and waist to crotch height) can be easily altered, however, pattern alterations such as the center back seam angle (affected by buttocks angle), the center front seam angle (affected by abdomen prominence), the proportion of front to back panels and side seam location (front and back depth proportions) are difficult areas to adjust in the automated system. Different block patterns based on body shape can solve the problem. Therefore, for this shape analysis, we omitted size-related variables such as girths and lengths because these measures are linked to relatively simple alterations. We focused instead on sorting into groups based on shape-related variables such as drops of girths. However, in different embodiments, (e.g., creation of ready-to-wear sizing systems), different sets of vertical and horizontal descriptors can be used for analysis.

Our results were derived for lower body measurements only, and for a population of U.S. women of age 18 to 35 within the 90th percentile of BMI (34.14). The methods disclosed herein can be used to develop body shape categories for the upper body, for larger women, for older women, and for women of different ethnicities. The methods can also be used to develop body shape categories for men. Successful sizing systems and mass customization systems can be based on complex variations in body shape and posture as well as size. With the use of 3D body scan data and the methods presented here for categorizing complex body shape measures reliably, these variations in the population can be addressed and accommodated.

6.2. Example 2

Development of Automated Custom-Made Pants Driven by Body Shape

Clothing fit is considered as a central element in clothing quality and customer satisfaction in the apparel industry. The right fit cannot be emphasized enough, and an appropriate fit not only ensures that the garment will wear well, but it will be worn often (Cotton Incorporated. (2002). Women uncover the key to looking great. Retrieved Jun. 26, 2010, from http://www.cottoninc.com/lsmarticles/?articleID=97). However, in a study of young women's attitudes toward clothing fit almost 54% of the respondents reported being from only somewhat satisfied to mostly unsatisfied with the fit of ready-to-wear apparel (Alexander, M., Connell, L. J., & Presley, A. B. (2005). Communications: Clothing fit preferences of young female adult consumers. International Journal of Clothing Science and Technology, 17(1), 52-64), and these figures are consistent with survey results from Kurt Salmon Associates (Kurt Salmon Associates. (2000, February). Which way to the emerald city? Consumers search for the ideal shopping experience. Paper presented at the American Apparel and Footwear Association Apparel Research Committee, Orlando, Fla., USA): approximately 50% of women and 62% of men cannot find good fit. Many studies concluded that substantial problems exist in the fit of ready-to-wear apparel.

Mass customization and automated custom clothing have recently been regarded as promising methods for the apparel industry to create well-fitting clothing for consumers; 3D body scanners are useful tools in implementing these processes. Brooks Brothers uses a 3D body scanner in their Manhattan retail store in New York to collect customers' measurements to create customized suits and utilizes their own custom patternmaking system to create an individual pattern based on his body measurements (Haisley, T. (2002, February). Brooks Brothers digital tailors measure up. Bobbin, 26-30). Lori Coulter produces custom-made swim suits using their 'TrueMeasure' process. Customers' measurements are taken from 3D body scanners in their store ([TC]$^2$. (2009). Custom clothing. Retrieved Apr. 4, 2010, from http://www.tc2.com/news/3 dbody.html). Expert consultants analyze each customer's body type, and provide the consumer with suggestions about flattering swimsuit styles for her body type. By providing fit that is individualized on the basis of the customer's objective body measurements, these companies provide improved fit for their customers.

Online mass customization initiatives can also be successful using self-reported measurements from the consumer. Archetype Solutions is a representative service provider for the made-to-measure apparel industry, and brings mass customization to the apparel industry in USA (Archetype Solutions. (n.d.). Refining apparel. Retrieved Aug. 26, 2009, from http://www.archetype-solutions.com). They have developed a simple and intuitive ordering process that allows the consumer to order a garment based on their body specifications and style preferences in a few minutes through the web using self-measurements. JCPenney, Lands' End, QVC, and indiDenim utilized Archetype technology for custom-made women/men's Chino pants or jeans, or men's dress shirts. An automated custom patternmaking process is used to create a pattern specific to each individual, and then the garment is made and shipped to the customer's home. According to their reports, around 40% of Lands' End shoppers chose a customized garment over the standard-sized equivalent when it was available. Reorder rates for Lands' End custom-clothing customers were 34% higher than for customers of its standard-sized clothing (Schlosser, U. (2004, December 13). Cashing in on the new world of me a handful of companies are finally perfecting made-to-order for the masses. Here's how. Fortune Magazine, Dec. 13, 2004). However, in 2009 Lands' End decided to stop producing custom-made pants or jeans for men and women while keeping men's custom-made dress shirts. Even though the reason of the closure of pants line was not announced, the major reason may be the difficulty providing fit satisfaction for their customers since lower body shapes are various and complex to identify, so the process of development of individualized pants patterns is more difficult than for shirts.

At the patternmaking level, there are several specialized automated computer-aided design (CAD) programs for generating custom patterns (AccuMark Made-to-Measure of Gerber Scientific, FitNet of Lectra Systems, Modulate of Optitex, and made-to-measure of Assyst Bullmer). Methods of altering patterns are slightly different depending on each system, but they can be categorized in approximately two ways. As the first method, the system needs to be set up with a body size table, graded patterns, and alteration rules for critical points on the patterns. The program selects the base size pattern from the graded set by comparing primary body measurements of the individual with the body size chart. Then, measurement differences at identified critical fit locations are automatically calculated. The system automatically applies specific changes to the chosen base pattern according to alteration rules developed for the pattern based on the measurement differences of the individual from the standard body measurements for that pattern. Multiple successive alterations are made to the base pattern, and a final pattern is generated that merges the full set of alterations. AccuMark Made-to-Measure (MTM) of Gerber Scientific, FitNet of Lectra Systems, and made-to-measure of Assyst Bullmer are all systems that operate in this way.

The second method parametrically changes a base pattern according to a set of defined dimensions. The system does not require the development of a body size table and alteration rules. Instead, it is necessary to define a set of dimensions for a specific style. For example, a parametric jacket can be defined using dimensions annotated as "Shoulder", "Bust", "Waist", and "Hips". The system shapes the jacket to fit these four dimensions. Each modification to the jacket can be visualized interactively when changing names and values. Once the parametric product is fully defined by a set of dimensions, it is ready to generate custom patterns. Modulate of Optitex is operated in this way. The two systems seem to be different, but the underlying theory is the same. In the apparel industry, more companies have used the first system than the second one.

Current automated CAD programs cannot generate custom clothing with perfect fit for each individual. Istook (Istook, C. L. (2002). Enabling mass customization: Computer-driven alteration methods. International Journal of Clothing Science and Technology, 14(1), 61-76) noted that commercial CAD systems are not only complicated, they also require a significant level of knowledge and practical experience not easily obtained. Apeagyei and Otieno (Apeagyei, P. R., & Otieno, R. (2007). Usability of pattern customizing technology in the achievement and testing of fit for mass customization. Journal of Fashion Marketing and Management, 11(3), 349-365) found that the software can manipulate standard type garments with basic features, but complicated styles such as asymmetric designs is still problematic. Ashdown and Dunne (Ashdown, S. P., & Dunne, L. (2006). A study of automated custom fit: readiness of the technology for the apparel industry. Clothing and Textiles Research Journal, 24(2), 121-136) explored issues in setting up a custom apparel patternmaking process using 3D body scanning and CAD software (FitNet of Lectra System). After three iterative corrections of all elements such as the reliability of body measurement data, the accuracy of body chart data, and the issue of fit preferences, only seven of ten participants could be provided with good fit. Except for these studies, there have been no studies about methods of utilizing this commercial CAD software for custom patternmaking.

It has been demonstrated in previous studies that it is difficult to generate jackets with perfect fit even after several corrections of all critical elements. When the hip girth was determined as a primary measurement for initiating the custom fit process, the fit at the bust was poor although the fit at the hip was appropriate, and when the bust girth was set as a primary measurement, the fit at the bust was appropriate, but the fit at the hip was not good. It was found that the system cannot generate custom garments with good fit and keep the original silhouette, if a person has a body size or body shape that differs greatly from the original body chart and fit model's body shape since this situation created the need for an extreme pattern alteration in a specific area.

This example demonstrates that if alterations start from differently shaped block patterns that are suitable for each body type, the automated customization system can generate custom clothing with improved fit.

The study described in this example tested whether improved customization could occur if the process is started from base patterns that are suitable for each customer's figure type and posture. A basic pants pattern for each body shape group was developed. The fit of pants created from an automated custom-made system using a single pattern (standard customization method) was compared with the fit of pants developed from an automated custom-made system using multiple patterns driven by body shape (body shape driven customization method).

There have been a few studies that analyzed the relationships between lower body shape and patterns. However earlier studies for pattern development based on body shape were limited to classification of the degree of buttocks prominence into two or three groups by visual judgment, or calculation of waist to hip proportion. As a foundation for this study, in the example disclosed in Section 6.1, Example 1, we developed a lower body shape categorization method by cluster analysis using five component scores derived from principal component analysis (PCA), so the development of block patterns in this study was based on a much more objective, data-driven, and detailed method.

Our method, disclosed above in Section 6.1, Example 1, was developed based on 2,981 women aged 18 to 35 in SizeUSA dataset, who are within the $90^{th}$ percentile (16.2 to 34.1) of body mass index (BMI) scores (excluding more obese women). Section 6.1, Example 1 focused on analysis of body shape rather than body size since the automated made-to-measure system can effectively alter the girth or length measurements, but it cannot automatically adjust the center back seam slope and the proportion of the front and back pattern pieces, which are related to body shape. To identify shape-related variable, the strength of the relationship between weight (a representative measurement related to body size) and 33 variables (18 raw measurements and 15 drops) related to lower body was examined by running bivariate correlation analysis using the statistical package SPSS 17.0. If there was a weak linear relationship between weight and a measurement, it was considered a shape-related variable. A total of 15 drops and 1 angle were considered as independent variables for the PCA: drop values of girths (hip to waist, top hip to waist, and hip to top hip), drop values of back arcs (hip to waist, top hip to waist, and hip to top hip), drop values of front arcs (hip to waist, top hip to waist, and hip to top hip), drop values of widths (hip to waist), drop values of depths (hip to waist), drop value of back depths (hip to waist), and drop values of front depths (abdomen to waist, and abdomen to hip) and buttocks angle.

From the PCA, as shown in FIG. 3, five principal components (PCs) were identified to represent distinctive shapes from the silhouette and profile views of the lower body: PC1: body measurements that define waist to top hip silhouette, PC2: body measurements that define top hip to hip silhouette, PC3: body measurements that define buttocks prominence, z-score 1: the drop of front abdomen depth to waist front depth, and z-score 2: the drop of front abdomen depth to front hip depth.

From cluster analysis using three PC scores and two z-scores, three body shape groups which were statistically different on all variables were found. Group 1 (curvy shape) has the curviest silhouette between waist level and top hip level, and the most prominent abdomen among the three groups (n=727, 29.2%); group 2 (hip tilt shape) has the most prominent buttocks, and their lower body is tilted toward the back (n=867, 34.9%); group 3 (straight shape) has a non-curvy silhouette and less prominent buttocks (n=894, 35.9%). FIG. 4 shows how the means of each variable compare among the three body shape groups. Front silhouettes and profile sketches of each lower body shape group are also shown in FIG. 5 for comparison.

This body shape analysis was the first stage in developing an improved automated custom patternmaking system. We developed a block pants pattern for each body shape group identified by this study and tested a shape-driven customization system whose alterations start from the appropriate block patterns for each of the three body shape groups.

Methodology

Test Garment Style

The test garment style was a pair of pants with two front darts, two back darts, and a straight silhouette from the abdomen and buttocks to hem. 'Trouser' described in Armstrong (Armstrong, H. J. (2006). Patternmaking for Fashion Design. New Jersey: Pearson Prentice Hall). The waist location was determined at the position of the natural waist. This style was chosen because of its ubiquity and potential for use as base pattern for other styles. The pants were made from stable medium weight cotton twill fabric in neutral color. The fabric used had mean weight of 256 g/m2 (7.56 ounces/yard$^2$) with standard deviation of 4 g/m2 (0.12 ounces/yard$^2$).

Use of an industry pattern was best for this study since the industry has developed well-shaped block patterns that embody much knowledge on good pants fit. We selected one of the styles produced by a major direct marketing (catalog and internet) retailer which has invested in the development of block patterns for their target market of women aged 18 to 35. The main criterion for selection of the style was fabric property since this influences ease amounts. This item was made from 100% cotton twill similar to the fabric used in this study, so it was considered appropriate for this study. The silhouette and design is slightly different from the test style, but they could be easily altered. Due to regulation of the retailer, patterns could not be officially provided. Instead, we bought a size 10 (hip girth: 40 in) of this style from their website. Then, the patterns were rubbed off, digitized using AccuMark Pattern Design System 8.3 software of Gerber Scientific, and altered them to the test garment style.

Recruitment for Selecting Fit Models (Stage 1: Development of Base Block Patterns) and Fit Testers (Stage 2: Validation of the Use of the Basic Block Patterns)

For development of base block patterns for each body shape group (stage 1), three to four participants needed to be recruited for each body shape group as fit models. For validation of the use of the basic block patterns in a custom fit process (stage 2), an additional ten participants for each body shape group were desirable as fit testers. Fit models had to have a hip girth measurement close to 101.6 cm (40 in), and also represent their body shape group as a whole to develop a pattern for each shape group in a base size. However, the fit testers needed to be in a range of sizes to see the fit of custom pants in various sizes. Therefore, the only requirement for the fit testers was that their hip girth was less than 123.4 cm (48.6 in) measurement (90th percentile of the hip girth distribution in SizeUSA). It was difficult to find fit models for stage 1 specifically, so participants were recruited for both stage 1 and 2 together. Then, fit models in appropriate size and shape groups were selected after recruitment of all participants.

Female participants aged 18 to 35 were recruited in January 2010, and they were scanned twice in minimal clothing (underwear and close fitting tank top/leggings) using a VITUS/XXL 3D Body Scanner by Human Solutions. Crotch height was manually measured since the scanner could not reliably measure this area. Scan files were converted to rbd format of NX16 Software version 6 from [TC]$^2$, and their measurements were taken using the [TC]$^2$ automatic measuring software, which was used to derive the SizeUSA data, to detect the same landmarks and measuring locations. Principal component analysis and cluster analysis (method developed in the foundation study disclosed in Section 6.1) was run again to classify each participant's body shape group and identify their position within the body shape groups in five variables (three PCs and two z-scores). We tried to recruit women across the full range of body sizes as proportionally as possible to test the custom fit process across the full range of body sizes. The hip girth in ASTM D5585-95 was selected as a key measurement for categorizing body size, and the number of participants in each shape group and their hip size was tracked while recruiting. After a total of 83 participants (group 1: n=26, 31.3%, group 2: n=18, 21.7%, group 3: n=39, 47.0%) were recruited, we found enough appropriate fit models (3 fit models×3 groups) and fit testers (10 fit testers×3 groups) for each body shape group: size 2 (n=3, 3.6%), size 3 (n=2, 2.4%), size 4 (n=5, 6.0%), size 5 (n=1, 1.2%), size 6 (n=3, 3.6%), size 7 (n=5, 6.0%), size 8 (n=8, 9.6%), size 9 (n=2, 2.4%), size 10 (n=8, 9.6%), size 11 (n=1, 1.2%), size 12 (n=8, 9.6%), size 13 (n=2, 2.4%), size 14 (n=2, 2.4%), and size 20 (n=1, 1.2%). Most of participants were willing to continue with the study, but three participants needed for stage 2 could not be reached. These three participants were included in groups 1, 2 and 3 respectively, so we had 9 fit testers in each body shape group.

Stage 1: Development of Base Block Patterns

An automated custom-made system was developed to generate custom patterns for the three fit models for each body shape group in AccuMark MTM of Gerber Scientific to reduce the number of fittings on fit models. Eight alteration locations were set to the system: front waist girth, back waist girth, hip girth, mid-thigh girth, knee girth, ankle girth, waist to crotch length, and inseam length. A pair of custom-made pants was sewn for each participant. We evaluated the fit of the pants using a standard list of fit parameters described by Leichty, Pottberg, and Rasband (Liechty, E. G., Pottberg, D. N., & Rasband, J. A. (1992). Fitting and Pattern Alteration: A Multi-Method Approach. New York: Fairchild Fashion and Merchandising Group.), which represent the indicators of the five basic components of fit: ease, line, grain, balance, and set (Erwin, M., Kinchen, L., & Peters, K. (1979). Clothing for Moderns (6th ed.). Englewood Cliffs, N.J.: Prentice Hall). A fit test was conducted with four postures (standing, sitting on a chair, walking, and stepping) to analyze the fit in both the standard position and in active positions. The pants were not expected to fit well at this stage due to the difficulty of creating perfect fit from measurements only. Therefore it was critical to mark via colored pens, pin in areas that needed to be altered, and to take photographs and scans of each participant wearing the pants to record the fit. After fitting the garments, the needed alterations indicated during the fitting were transferred back to the patterns using Pattern Design System 8.3 of Gerber Scientific. The patterns were then plotted again and a new pair of custom pants was made. To get perfect patterns, each fit model was asked to return for fittings at least three iterations. Patterns were compared within each body shape group and among body shape groups to identify and validate differences.

The final fit model's measurements including waist girth, top hip girth, hip girth, thigh girth, knee girth, ankle girth, waist to crotch length, inseam length, buttocks angle, and abdomen depth were compared with the median values of their body shape group. Fit models could never have perfect median measurements of their body shape group. If their body measurements and median values were not very different, we did not alter the pattern since fittings were conducted to perfect fit on the fit models. When the differences were relatively large, patterns were altered to meet either the median values, or between the median value and the fit model's measurement. In each case, we used our judgment to decide the appropriate action.

Stage 2: Validation of the Use of the Basic Block Patterns for Different Shape Groups in a Custom Fit Process Using AccuMark MTM, we developed two automated customization systems; standard customization method which alterations started from a single pattern (industry pattern), and body shape driven customization method which alterations started from one of the three different block patterns developed in stage 1 for each body shape group. The general process of developing made-to-measure systems is as follows:

(1) The base patterns (size 12) for each body shape group were graded (size 2 to 20) in Pattern Design System 8.3, according to a grading method from a grading class provided by Gerber Scientific in New York. This method is the most common grading method which is used in the New York apparel industry.

(2) In Pattern Design System 8.3, alteration points corresponding to the five locations (waist girth, hip girth, thigh girth, waist to crotch length, and inseam length) which were identified as the alteration needed were numbered. Alteration rules were set up in the alteration rule file in AccuMark Explore.

(3) Three body charts (one for each body shape group) were made. The most representative fit models' measurements were used for the size 12, and the size intervals from ASTM D 5585-95 were used to develop the chart. The charts were saved in AccuMark MTM.

(4) Hip girth was selected as a primary measurement for selection of each participant's base size. Rules (the hip girth range of each size) were saved in AccuMark MTM.

When generating custom-made patterns, the system first selected a base size pattern of the individual by comparing her primary body measurement with that in the body chart. After selecting the base size pattern from the graded nest (standard customization method: an industry pattern, body shape driven customization method: one of the three block patterns), the system compared the rest of her measurements with those in the body chart, and calculated the alteration amounts at each location. Each alteration was made according to the alteration rules. All of the alterations were combined, and the final custom pants patterns were generated.

Twenty seven participants (9 fit testers×shape group) tried on two pairs of pants, and judged the fit in four postures (standing, sitting on a chair, walking, and stepping) in the two sets of pants. Four photographs (front, side, and back view of the standard posture, and side view of the sitting posture) were taken for expert judges' visual fit evaluation. They then filled out a questionnaire regarding fit of the pants at 12 body locations; waist ease, abdomen ease, hip ease, thigh ease, knee ease, crotch ease, front waist placement, back waist placement, crotch placement, hip placement, side seam placement, and inseam length [wearers' fit evaluation]. A five-point scale was used for this study. The end points of each scale varied depending on the fit location, for example very tight (1)—very loose (5) or very short (1)—very long (5). The middle value of the scale, 3, represented good fit. The participants rated overall fit satisfaction on a five-point Likert scale, ranging from 1 (very dissatisfied) to 5 (very satisfied). They repeated this process with the second pair of custom pants. To prevent bias introduced from the order of donning pants, we alternatively provided the two pairs of pants. At the end, each participant was asked to choose which of the two pair of pants fitted them best.

Three expert fit judges working in the women's apparel industry performed visual analysis of the fit of the pants as well [expert fit judges' visual fit evaluation]. Each fit judge had worked as a designer or technical designer in the women's woven apparel industry for eight years or more. Each judge was provided with 27 questionnaires for 27 sets of pants for each set of test pants (A—made by body shape driven alteration method, B—made by standard alteration method) for fit analysis. The fit of the pants was judged from photographs taken during the wearers' fit test. They analyzed front waist ease, abdomen ease, front thigh ease, front crotch ease, crotch length, inseam length, back waist ease, back hip ease, back thigh ease, back crotch ease, front waist placement, back waist placement, side seam placement, and overall fit. The scaling method was the same as the wearers' fit evaluation. At the end of the questionnaire, judges chose their best fitting pair overall.

Analysis Method for Comparison of Two Made-to-Measure Systems

To judge which type of pants provided better fit in each body area, the scale 3 was re-coded as '1 (good fit)', and the rest of scales (1, 2, 4, and 5; e.g., very tight (1), tight (2), loose (4), very loose (5) at waist ease] as '0 (poor fit)'. A generalized estimating equation (GEE) was performed to test whether the body shape driven customization method (pants type A) can generate custom-made pants with better fit than the standard customization method (pants type B) using SPSS 17.0. This analysis assessed 12 locations for the two main effects (pants type and shape group) and one two-way interaction (pants type×shape group) at 95% confidence level. If no significant interaction was found, GEE was re-performed with only the two main effects. F-values and means for each location were examined. In locations where both a 'pants type' main effect, and a 'pants type×shape group' interaction were found, means of type A and B were compared in each shape groups using pairwise comparison analysis at 95% confidence level. Then, we returned to the data coded by a five-point scale, and cross-tabulations of frequencies of fit scores were calculated to identify which fit problems each pants type had depending on body shape group.

Regarding analysis of overall fit satisfaction judged by a five-point scale, ranging from 1 (very dissatisfied) to 5 (very satisfied) [continuous variable], linear mixed models (LMM) was utilized instead of GEE. For the last question in which wearers chose the best fitting pair, frequencies were calculated.

For analyzing the results of the expert fit judges' fit analysis, 'judge' variable should also be considered. Therefore a main effect (judge) and two two-way interactions (pants type×judge, and shape group×judge) were additionally as independent variables, the process was the same as the wearers' fit analysis.

General methods for fit judging are well known in the art, see, e.g., Ashdown, S. P. et al (2004), J. Textile & Apparel, Technology Management 4(1):1-2; Ashdown, S. P. & O'Connell, E. K. (2006), Clothing Textiles Res. J. 24(2):137-148; Bye, E. et al. 2005, J. Textile & Apparel, Technology Management 4(3):1-5; Erwin, M. et al. 1979, Clothing for Moderns, 6$^{th}$ ed., Englewood Cliffs, N.J.: Prentice Hall; McConville, J. T. Anthropometric fit testing and evaluation. In R. L. Barker et al. Eds, Performance of Protective Clothing ASTM STP900 (pp. 556-568); Philadelphia, Pa., American Society for Testing and Materials; and Speer, J. K. 2008, Victoria's Secret: Framing the fit problem. Retrieved August 2009 from Apparel Magazine: http://www.apparelmag.com.

Results

Fit Models Selected for the Block Patternmaking

A description of the method for selecting three fit models for group 1 is set forth below as one example. The process of selection of fit models for group 2 and 3 is depicted graphically in the fit models' pentagonal graphs in FIG. 16B. The pentagonal graphs of 10 best fit model candidates (based on their measurements) among 26 participants from group 1 are shown in FIG. 16A. It was impossible to find perfect fit models that had median values of the group 1 in all five variables. The main criteria of selection of fit models were PC3 (buttocks prominence), z-score 1 (abdomen prominence) and z-score 2 (slope from abdomen point to front hip point). The three variables were related to abdomen and hip shape which were critical elements to develop center front seam slope, center back seam slope and crotch extension of the block patterns. These locations in patterns are difficult to develop from measurements alone, so fittings on live fit models with median values of these three variables are preferred. On the other hand, PC1 (waist to hip silhouette) and PC2 (top hip to hip silhouette) were related to girth measurements, which could be relatively easily applied for pattern making. Regarding PC3 (buttocks prominence), the scores of participants #26, #32, #41, #42, and #50 were located far away from the median values of group 1, so they were removed from the candidate list. #11 had almost median values in all three critical variables: PC3, z-score 1, and z-score 2. She had a slightly smaller top hip girth than the median value, resulting in a smaller PC1 (waist to hip silhouette) score and a larger PC2 (top hip to hip silhouette) score. Increasing top hip girth in her pattern was relatively easy, so she became a fit model for group 1. #52 had also median values in four variables: PC1, PC3, z-score 1 and z-score 2, while PC2 score was larger than the median value, which means hip width is wider than the median value. This person was also determined as a fit model. The last fit model was selected between participant #20 and #46. For the values of PC1, PC2 and z-score 1, neither #20 nor #46 had scores which were very close to the median values by similar amounts. But #20 had almost median values in PC3 (buttocks prominence) and z-score 2 (slope from abdomen point to front hip point), while #46 had median value in only PC3 (buttocks prominence). Therefore #20 was selected as the last fit model.

Stage 1: Development of Final Block Patterns

In FIG. 17, the three final block patterns (used for shape driven customization system) and the industry pattern (used for standard customization system) are superimposed for comparison. The most obvious difference in patterns is the center back seam slope. The buttocks of group 2 were the most prominent (25.8°), group 1 and 3 had a medium degree of prominence (21.3° and 20.6°), and the fit model for the industry pattern had the flattest buttocks (15.5°). Accordingly, the center back seam slope of group 2 was the most tilted and that of the industry pattern was the most vertical. Another difference among patterns was the center front seam slope. The difference in center front seam slope was influenced by the drop of front abdomen depth to front hip depth. Group 2 had the largest drop (the posture is tilted toward the back), so the center front seam slope is the most tilted. The third difference was the silhouette of the side seams. Group 3 had a straight shape while group 1 had a curvy waist to hip shape and a prominent abdomen, and group 2 had prominent buttocks. Therefore, group 3 has straighter side seams from waist to hip level than the other groups. Group 1 has curvier side seams from waist to top hip level than the others. Regarding the proportion of front pattern to back pattern at waist level, group 1 proportion is 1:0.97, group is 2 1:1.08, and group 3 is 1:1.02. The front pattern piece of group 1 has a larger proportion compared to the back, while the others have smaller front patterns compared to the back. The proportion of the front pattern piece to the back pattern piece at the hip level is similar for all three groups (1:1.06=front:back). The side seam of the industry pattern is located further toward the front than the other three group patterns (a smaller front pattern piece and larger back piece with proportions of 1:1.30 at waist level and 1:1.21 at hip level).

It was difficult to analyze crotch length in relation to body shape and size, since max-thigh girth, hip depth and abdomen depth were inter-related and influenced the pattern shapes simultaneously. One of the reasons that group 2 has the longest crotch extension was because the fit model of group 2 has the largest thigh girth. Another possible contributing factor is that group 2 has the most prominent buttocks, so this depth influenced the amount of the crotch extension. Group 1 and 2 have a similar thigh girth (24.05 and 24.00 in), so the amounts of their crotch extensions are similar. The proportion of front to back crotch extension was not quantified in relation to body shape differences.

Stage 2: Comparison of Fit of the Pants Made by the Body Shape Driven Customization System (Type A) and the Standard Customization System (Type B)

Expert Fit Judges' Evaluation

Regarding the best fitting pair overall, 70.4% (n=57) of the judges' ratings (a total of 81=3 judges×27 participants' pants) ranked pants type A (shape driven customization system) the highest, and 24.7% (n=20) ranked pants type B (standard customization system) the highest. In 4.9% (n=4) of the cases that the judges were not able to choose between pants type A and B indicating that in these cases they were the same overall fit. Linear mixed models (LMM) was utilized to identify the overall fit [1 (very bad), 2 (bad), 3 (neutral), 4 (good), and 5 (very good)] for the three main effects (pants type, shape group, and judge) and three two-way interactions (pants type×shape group, pants type×judge, and shape group×judge) (Table 16, FIG. 19). There was no significant interaction in this model. There were significant main effects of 'pants type' [F (1, 124)=24.09, p<0.05], and 'judge' [F (2, 124)=3.26, p<0.05] on overall fit scores. Pants type A (Mean=3.61, SE=0.11) had significantly higher overall fit scores than pants type B (Mean=3.03, SE=0.11). Judges had different levels of rating on overall fit, but there was no problem on interpreting the results of the 'pants type' effect since there was no interaction between judges and the other two main effects.

To compare which type of pants provided better fit in each body area, a generalized estimating equation (GEE) was used to analyze the fit [0 (bad), 1 (good)] at 13 locations for the three main effects (pants type, body group, and judge) and three two-way interactions (pants type×body shape group, pants type×judge, body shape group×judge) (Table 17, FIG. 19). There was a significant main effect of pants type on front waist ease (Mean: A=0.90, B=0.59), back waist ease (A=0.83, B=0.37), front waist placement (A=0.79, B=0.60), back waist placement (A=0.88, B=0.69), crotch length (A=0.85, B=0.16) and side seam (A=0.85, B=0.16) (p<0.05). In all six locations, type A ratings were significantly higher than type B. Especially in the areas of side seam placement, back waist ease, and front waist ease, type A was rated higher than B. In all six locations, there was no type by group interaction, which means that type A was ranked higher than type B in all groups. Regarding the type by judge interactions, an interaction was found only at the front waist placement. It means that in the rest of the locations, all judges ranked type A higher than type B. At front waist placement, it was necessary to examine pairwise comparison of means of type depending on judges since there was a significant type by judge interaction. Two judges rated type A higher than B (Mean A-B: judge 2=0.27, judge 3=0.18, p<0.05), but one judge rated type A lower than B (A-B=−0.13).

At abdomen ease, buttocks ease, front crotch ease, and front thigh ease, type A was judged to have tendencies toward better fit even though the differences of the two types were not significantly different. At back crotch ease, thigh ease, and inseam length, type B had a tendency to exhibit equal or better fit, but the fit variables were not significantly different and the fit differences were not large.

To analyze which type of pants provided better fit depending on body shape groups, paired t-test was conducted after splitting the data by shape groups (Table 18, FIG. 20). At front waist ease, type A significantly provided better fit in group 1 and 2 (Mean A-B: group 1=0.44, and group 2=0.37) (p<0.05). According to frequencies of fit scores, type A provided good fit for 92.6% of group 1, 88.9% of group 2, while type B provided good fit for 48.1% of group 1, and 51.9% of group 2. Type B had tight fit problems for 51.8% of group 1 and 44.4% of group 2 (FIG. 18). At back waist ease, type A provided better fit in all three groups with significant differences (A-B: group 1=0.37, group 2=0.52, and group 3=0.41) (p<0.05). Type A provided good fit for 74.1% of group 1, 81.5% of group 2, and 88.9% of group 3, while type B provided good fit for 37.0% of group 1, 29.6% of group 2, and 48.1% of group 3. Type B had tight fit for 29.6% and loose fit problems for 33.3% of group 1, loose fit problems for 48.1% of group 2, and loose fit for 37.2% of group 3.

At front waist placement, type A provided significantly better fit than B in group 3 (A-B=0.26, p<0.05). Type A provided good fit for 77.8% of group 3, while type B provided good fit for 51.9% and low placement for 37.0%. At back waist placement, type A provided significantly better fit for group 2 (A-B=0.33) and 3 and (0.22) (p<0.05). In group 2, type A provided good fit for 96.3% while type B for 63.0%. In group 3, type A provided good fit for 77.8% while type B for 55.6%. In group 2 and 3, high back waist placement was found for 29.6%. At crotch length, type A provided significantly better fit for group 1 (A-B=0.41, p<0.05). Type A of group 1 had a high frequency of good fit (55.6%), but type B had long crotch lengths for 74.1%. At side seam location, type A provided significantly better fit for all groups with large differences (A-B: group 1=0.56, group 2=0.59, group 3=0.78) (p<0.05). Type A provided good fit for 77.8% of group 1, 81.5% of group 2, and 88.9% of group 3. On the other hand, type B provided forward side seam location for 55.5% of group 1, 62.9% of group 2, and 66.6% of group 3.

For the rest of the fit locations, positive or negative directions could show which type had a tendency toward slightly better fit in Table 18 (FIG. 20), but the differences were small and there were not significant differences between the two types.

Wearers' Fit Evaluation

About the best fitting pair overall, for all groups 59.3% (n=16) out of 27 wearers selected type A, and 40.7% (n=11) for type B. In group 1 and 3, 66.7% (n=6) of wearers chose type A, and 33.3% (n=3) selected type B. However, in group 2 results were more evenly divided, as 44.4% (n=4) of wearers chose type A and 55.6% (n=5) selected type B. Linear mixed models (LMM) showed that overall fit satisfaction was not significantly different between the two types (Mean: A=3.44, B=3.43).

To compare which type of pants provided better fit in each body area, a generalized estimating equation (GEE) was used to analyze the fit [0 (bad), 1 (good)] at 12 locations for the two main effects (pants type and shape group) and one two-way interaction (pants type×shape group). There were significant main effects of pants type on waist ease (Mean: A=0.75, B=0.44) and abdomen ease (A=0.85, B=0.56) (p<0.05). In both waist and abdomen, type A provided significantly better perceived fit than type B, and there was no type by group interaction, which means that type A was ranked higher than type B in all groups. At waist, type A provided good perceived fit for 77.8% of group 1, 77.8% of group 2, and 66.7% of group 3. Type B had tight perceived fit problems for 44.4% of group 1, tight perceived fit for 33.3% and loose perceived fit for 22.2% of group 2, and loose perceived fit for 55.5% of group 3. At abdomen, type A generally provided good perceived fit for 77.8 to 88.9% of the groups as well. Type B provided tight perceived fit for 44.4% of group 1, tight perceived fit for 22.2% and loose perceived fit for 22.2% of group 2, and loose perceived fit for 22.2% of group 3. These two locations were close each other, so these fit problems were generated in the same general area within the pattern.

Conclusion and Discussion

The development of block patterns for this example was based on detailed body shape analysis and objective grouping, and used more sophisticated patternmaking and fitting procedures to arrive at an appropriate pattern shape. This example demonstrates a new method for selecting fit models and developing pattern blocks. Block patterns were developed by fitting pants on multiple fit models, so that block patterns had more reliability and validity than those that are developed by fitting to a single model. When fit models are selected, their body sizes (e.g., waist girth and hip girth) are usually considered, but in this example, fit models were selected with consideration of body shape as well. Eighty three participants' five variable scores were compared with the median size model's scores of their body shape group using pentagonal graphs. Each individual's placement of five variables was compared within the group and among the groups, and the most representative three fit models were selected.

This example demonstrates a shape-driven customization system whose alterations start from appropriate block patterns. Pants from an automated custom-made system using multiple patterns driven by body shape (type A: body shape driven customization method) are judged to have better fit than pants created from an automated custom-made system using a single pattern (type B: standard customization method). The results of experts' fit evaluation showed that type A provided significantly better fit at waist ease, waist placement, crotch length, and side seam placement (p<0.05). Wearers' fit analysis showed that type A was judged to have better fit at waist and abdomen with significant differences (p<0.05). At the rest of locations, the fit of two types were not significantly different.

At the waist and abdomen, type A provided good fit for most of the wearers, and definitely provided better fit than type B. At the hip, type A had good or relatively loose fit. However, type B had tight fit problems at the front waist, loose fit problems at the back waist, and tight fit problems at the back hip overall (FIG. 17). These fit problems caused tight fit problems at the back crotch. The fit problems of type B were caused by the center back seam slope and side seam placement in block patterns, which were not balanced for each participant's body shape. While the alteration process of type B started from a single block pattern regardless of body shapes, type A was made on the basis of block patterns of their selected group that are balanced and corrected for each participant's figure type and posture. The made-to-measure system could effectively alter the girth measurements, but it could not automatically adjust the center back seam slope and the proportion of the front and back pattern pieces from the block patterns. Therefore in type B, even though the waist girth and hip girth were adjusted to meet each participant's size, the front waist was tight and back waist was loose since the center back seam angle in their block patterns was too vertical for their back waist to buttocks shapes, and the side seam location was too forward for their front to back proportions.

This example tests a shape-driven customization system whose alterations start from appropriate block patterns. This example demonstrates that the automated system disclosed herein, which uses different block patterns shaped for different body shapes, can be used for custom pattern generation. The results of this study show that the above-described system incorporating body shape information into block patterns can generate custom patterns with better fit.

Appropriate block patterns were found to improve fit of custom pants generated by automated made-to-measure CAD software. However, a well-shaped block pattern is just one element that can be used in setting up the system. Other elements can also be included, such as a body size chart that reflects the target market, graded patterns that are used for alteration, appropriate alteration rules, accommodation of an individual's fit preference to the system, and methods for acquiring accurate measurements that are matched to those in a body chart.

Among these elements, appropriate alteration rules can determined as follows. Alteration rules can be made simple to reduce the influence of alteration rules on the system and to judge influences of block patterns on the system. Alteration rules can be set up, for example, only at primary locations such as waist girth, hip girth, thigh girth, waist to crotch length, and inseam length. However if multi-dimensional and specified alterations are set up in the system, they can help with improving fit of custom clothing generated by the system.

Commercial systems are currently available that use body measurements to generate custom fit patterns by applying automated alterations to a graded pattern. However, various elements such as body charts, block patterns, grading, and garment charts need to be correctly set up in the system, so the preparatory activities are laborious. Limited alterations are conducted because the system selects a pattern from a previously graded nest of patterns and alters it.

By contrast, this example demonstrates that new software can be created for automated production of custom-made patterns directly from an individual's body measurements, so that the laborious process for matching all these elements is not necessary. In this example, we acquired 27 fit models' numerous detailed body measurements such as depth, width, front and back arcs taken from the 3D scans, and their well-fitted custom patterns. It would be well within the skill of one skilled in the art to determine the variations between the pattern and the body. This information can then be used to generate algorithms to change the block pattern according to an individual's body measurements.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All references cited herein are incorporated herein by reference in their entirety and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

What is claimed is:

1. A computer-based method for categorizing body shape comprising the steps of:
providing a data set of body shape-defining measurements of a portion of the body of interest from a plurality of subjects' bodies, wherein the measurements define a silhouette and profile (front and side) perspectives of the portion of the body of interest;
conducting a principal component (PC) analysis of the data set of measurements to calculate and generate PC scores;
conducting cluster analysis using the PC scores as independent variables to produce cluster analysis results;
conducting a discriminant analysis to classify body shapes identified from the cluster analysis results; and
establishing one or more body shape categories from the cluster analysis results,
thereby categorizing body shapes of the plurality of subjects.

2. The method of claim 1 wherein the body shape-defining measurements are derived from three-dimensional (3D) body scans.

3. The method of claim 1 wherein the body shape-defining measurements are selected from the group consisting of girth, width, front arc, back arc, front depth, back depth, length, length proportion and drop value between two measurements of primary body locations.

4. The method of claim 1 comprising the step of identifying one or more discriminant functions that define body shape category.

5. The method of claim 1 comprising the step of calculating one or more discriminant function score from an individual subject, thereby determining the individual subject's body shape category.

6. The method of claim 1 comprising the step of determining a range of discriminant function scores for each body shape group.

7. The method of claim 1 comprising the step of calculating one or more discriminant function scores from the body-shape defining measurements of the individual subject.

8. The method of claim 7 comprising the step of comparing the individual subject's calculated discriminant function scores with the range of discriminant function scores for each body shape group.

9. The method of claim 1 comprising the step of utilizing multiple measurements that categorize silhouette and profile views of the body simultaneously.

10. The method of claim 1 comprising the step of using drop values of body-shape defining measurements.

11. The method of claim 10 wherein the body-shape defining measurements are derived from 3D body scans.

12. The method of claim 1 comprising the step of utilizing a buttocks angle and a plurality of proportional measures of widths, depths, front/back depths, girths, and/or front/back girths of lower body locations of interest.

13. The method of claim 1 comprising the step of categorizing one or more lower body shape groups by K-means cluster analysis using one or more PC scores and/or one or more z-scores.

14. A shape prototyping system for designing a custom fit garment for an individual subject comprising:
(a) a data set of body-shape defining measurements from a plurality of people representative of a population of interest to characterize the spectrum of body shapes and postures for which the custom fit garment is to be designed
(b) a computer-based method for analysis of the measurements, wherein the computer-based method determines one or more prototype body shapes that identify or quantify a spectrum of shapes and postures that represent the population of interest;
(c) an adaptable guiding pattern for creating a parameterized pattern, wherein the adaptable guiding pattern comprises a structural form and a set of customizable distance and angle parameters, and wherein parameter values are matched to dimensions of the individual subject so that the parameterized pattern will specify a good-fit garment for the individual subject;
(d) a computer-based method for creating a set of modified guiding patterns from the adaptable guiding pattern wherein each of the set of modified guiding patterns is matched to each of the prototype body shapes identified in (b);
(e) a method for identifying the appropriate body-shape prototype guiding pattern for the individual subject's set of body shape-defining measurements; and
(f) a method for producing a parameterized pattern from a modified guiding pattern, comprising the step of establishing the modifying guiding pattern distance and angle parameters for the selected guiding pattern from the individual subject's set of body shape-defining measurements.

15. The system of claim 14 wherein the method of (f) comprises a method for producing a conventional pattern from which the custom-fit garment can be made from the parameterized pattern.

16. The system of claim 14 wherein the computer-based method of (b) comprises conducting principle component (PC) analysis of the body shape-defining measurements to derive principle components (PCs) and conducting an unsupervised clustering algorithm on the PCs.

17. The system of claim 14 wherein the method of (f) is refined empirically by analyzing a range of size adjustments and/or using a panel of experts to determine good-fit outcomes by observing garment fit on a set of fit models.

18. A system for computer-assisted designing of a custom fit garment for an individual subject comprising:
(a) an adaptable guiding pattern, wherein the adaptable guiding pattern comprises a structural form and a set of customizable distance parameters for creating a parameterized pattern, and wherein the values of the parameters are matched to body shape of the subject so that the parameterized pattern specifies a good-fit garment for that individual;
(b) a machine learning system for predicting a set of subject distance parameters for the guiding pattern given a set of body-shape defining measurements taken from the subject;
(c) a computer algorithm for combining a subject's distance parameters with the structural form of the guiding pattern to produce a conventional pattern from which the custom-fit garment can be made; and
(d) a documented database for training the machine learning system, wherein the documented database is associated with each modified guiding pattern, and wherein the database comprises multiple tuples of distance parameter values, associated distance parameters, and good-fit outcomes.

19. The system of claim 18 wherein the documented database comprises good and poor good-fit outcomes.

20. The system of claim 18 wherein the documented database is created by testing a range of predictions and/or using a panel of experts to determine good-fit outcomes by observing garment fit on a set of fit models.

* * * * *